(12) United States Patent
Erbe et al.

(10) Patent No.: US 10,861,114 B2
(45) Date of Patent: Dec. 8, 2020

(54) VARIATIONS MANAGEMENT

(71) Applicant: TEXTURA CORPORAITON, Deerfield, IL (US)

(72) Inventors: Paul F. Erbe, Mount Prospect, IL (US); David M. Freeman, Oak Park, IL (US); John W. Smith, Grayslake, IL (US); Christopher R. Vernon, Lake Bluff, IL (US); James Stanley Bohnert, Mundelein, IL (US)

(73) Assignee: TEXTURA CORPORATION, Redwood Shores, CA (US)

( * ) Notice: Subject to any disclaimer, the term of this patent is extended or adjusted under 35 U.S.C. 154(b) by 460 days.

(21) Appl. No.: 15/549,699

(22) PCT Filed: Feb. 27, 2015

(86) PCT No.: PCT/US2015/018039
§ 371 (c)(1),
(2) Date: Aug. 9, 2017

(87) PCT Pub. No.: WO2016/137499
PCT Pub. Date: Sep. 1, 2016

(65) Prior Publication Data
US 2018/0012315 A1 Jan. 11, 2018

(51) Int. Cl.
*G06Q 50/08* (2012.01)
*G06Q 30/04* (2012.01)
(Continued)

(52) U.S. Cl.
CPC ............ *G06Q 50/08* (2013.01); *G06Q 30/04* (2013.01); *G06Q 40/12* (2013.12); *G06Q 50/18* (2013.01)

(58) Field of Classification Search
CPC ........ G06Q 50/08; G06Q 50/18; G06Q 40/12; G06Q 30/04
See application file for complete search history.

(56) References Cited

U.S. PATENT DOCUMENTS

| | | | |
|---|---|---|---|
| 7,089,203 B1 * | 8/2006 | Crookshanks | G06Q 40/04 345/543 |
| 7,756,772 B1 * | 7/2010 | Konopnicki | G06Q 30/06 705/26.8 |

(Continued)

OTHER PUBLICATIONS

"Primavera Contract Management". Author unknown. Retrieved from <http://www.oracle.com/us/products/applications/primavera/047062.pdf>. (Year: 2009).*

(Continued)

*Primary Examiner* — Nathan A Mitchell
(74) *Attorney, Agent, or Firm* — Kraguljac Law Group, LLC

(57) ABSTRACT

Systems and methods are presented by which a contractor can initiate a proposed variation to a project contract and request payments against the proposed variation even before the variation is approved by the other party to the project contract. A data structure representative of proposed variation is generated and maintained as the proposed variation is reviewed, approved, and elevated to become part of the actual budget for the project. Because the same data structure is maintained throughout the process and after the proposed variation is approved, payment requests, payments, and any other actions taken against the data structure before the proposed variation is approved are automatically linked to the actual budget after approval and, thereby, are recognized and processed by external accounting systems as though the variations were created by the other party to the contract.

20 Claims, 25 Drawing Sheets

(51) Int. Cl.
*G06Q 40/00* (2012.01)
*G06Q 50/18* (2012.01)

(56) References Cited

U.S. PATENT DOCUMENTS

| | | | | |
|---|---|---|---|---|
| 8,108,232 | B1* | 1/2012 | Brandes | G06Q 10/063 705/7.11 |
| 8,296,199 | B2* | 10/2012 | Allin | G06Q 10/06 705/30 |
| 2002/0087705 | A1* | 7/2002 | Smyth | H04L 67/06 709/229 |
| 2006/0242419 | A1* | 10/2006 | Gaffey | G06Q 10/06 713/176 |
| 2007/0088561 | A1* | 4/2007 | Zeibig | G06Q 50/18 434/350 |
| 2007/0265963 | A1* | 11/2007 | Allin | G06Q 10/00 705/40 |
| 2007/0288364 | A1* | 12/2007 | Gendler | G06Q 10/06313 705/39 |
| 2009/0018889 | A1* | 1/2009 | Petersen | G06Q 10/06375 705/7.37 |
| 2011/0015956 | A1* | 1/2011 | Curd | G06Q 10/063 705/7.11 |
| 2011/0137712 | A1 | 6/2011 | Whitesage | |
| 2011/0213631 | A1 | 9/2011 | Mislavsky | |
| 2012/0095829 | A1 | 4/2012 | Harper et al. | |
| 2013/0018770 | A1* | 1/2013 | Co | G06Q 40/06 705/37 |
| 2013/0054485 | A1* | 2/2013 | Allin | G06Q 10/06 705/342 |
| 2014/0229212 | A1 | 8/2014 | Macelheron et al. | |
| 2015/0193886 | A1* | 7/2015 | Trickel | G06Q 40/12 705/30 |
| 2015/0213397 | A1* | 7/2015 | Arena | G06Q 10/063118 705/7.17 |
| 2016/0048806 | A1* | 2/2016 | Epson | G06Q 10/103 705/301 |
| 2017/0193412 | A1* | 7/2017 | Easton | G06Q 10/06313 |

OTHER PUBLICATIONS

Patent Cooperation Treaty (PCT) International Search Report and Written Opinion in co-pending PCT International Appl. No. PCT/US2015/018039 (International Filing Date of Feb. 27, 2015) dated Jun. 19, 2015 (15 pgs.).

\* cited by examiner

FIG. 6

Textura System: Create Variation https://iat.texturallc.net/system/CreateVar.psp?projectID=14304&contractID=663521

Home | Log Out

Propose Variation
Project: XYZ Apartment Complex
Contract: 44142 Electrical
Period: #6 (July)

John Doe
ABC Electric Co.

| Submit Selected | Save Draft |
+ Add Line

| Select | Number | Title | Description | 📎 | Amount | Date | Work Started | Proceed Date |
|---|---|---|---|---|---|---|---|---|
| ☐ | V002 | Variation 2 | | (1) | 2,345.02 | 12-May-2014 | ☐ | |
| ☐ | V003 | Variation 3 | | (0) | 4,567.03 | 12-May-2014 | ☑ | 5-May-2014 |
| ☑ | V004 | Variation 4 | | (1) | 457.04 | 12-May-2014 | ☐ | |
| ☐ | V005 | Variation 5 | | (0) | 2,452.05 | 12-May-2014 | ☐ | |
| ☐ | V007 | Variation 7 | | (2) | 8,567.07 | 12-May-2014 | ☐ | |
| | | | | | 29,555.77 | | | |

Number of Records [50 ▼]    ◁◁ ◁ 1-5 of 5 ▷ ▷▷

Original Contract Value: 100,000.00
Approved Variations: 117,600.00
Contract Sum to Date: 217,600.00
Requested Variations: 11,019.12
Potential Contract Sum: 228,619.12

Textura System: Variation Register https://iat.texturallc.net/system/VarReg.psp?projectID=14304&contractID=23019

Home | Log Out

Variation Register

Project: XYZ Apartment Complex
Contract: 44142 Electrical

John Doe
ABC Electric Co.

Contracts: 44142 Electrical ▼  Edit SoV  Contract Status

| Period | Number | Title | Description | 📎 | Submit Date | Submitted Amount | Billed to Date | Approved Amount | Status | Variation # |
|---|---|---|---|---|---|---|---|---|---|---|
| 5 | V002 | Variation 2 | | (0) | 12-May-2014 | 2345.02 | | 2,200.00 | Approved | SV03 |
| 5 | V003 | Variation 3 | | (1) | 12-May-2014 | 4567.03 | 4567.03 | 4,500.00 | Approved | SV04 |
| 5 | V004 | Variation 4 | | (0) | 12-May-2014 | 457.04 | | 0.00 | Rejected | R01 |
| 5 | V005 | Variation 5 | | (0) | 12-May-2014 | 2452.05 | | | Submitted | SV06 |
| 5 | V007 | Variation 7 | | (0) | 12-May-2014 | 8567.07 | | | Submitted | |
| 5 | | GC Variation 2 | | (0) | 21-July-2014 | | | 100,000.00 | Approved | SV05 |

Totals: 30,555.27  15,734.09  117,600.00

Base Contract Value: 100,000.00
Approved Contract Value: 217,600.00
Unapproved Variations: 11,019.12
Proposed Contract Value: 228,619.12

◀◀ ◀ 1-6 of 6 ▶ ▶▶

Number of Records 50 ▼

FIG. 7

Textura System: Create Variation

← → × ⌂ | https://iat.texturallc.net/system/VarReg.psp?projectID=14304&contractID=663521 | 🔍

Match Variations

Project: XYZ Apartment Complex  
Contract: Design & Construction

[Home] [Log Out]

Bill Johnson  
Johnson General Contracting Co.

5 remaining Unmatched Imported Variations  
Organisation-Contract:

| ABC Electric Co. - 44142 Electrical | | | |
|---|---|---|---|
| Var # | Title | Description | Approved Value | Status |
| SV03 | 47023020-V002 | Variation 2 | 2200.00 | Approved |

[Match] [New] [Cancel]

| | Number | Title | Description | Submitted Date | Submitted Value | Billed to Date | Private Comment |
|---|---|---|---|---|---|---|---|
| ☐ | V002 | Variation 2 | | 12-May-2014 | 2,345.02 | 0.00 | Glazing 4th floor |
| ☐ | V003 | Variation 3 | | 12-May-2014 | 4,567.03 | 1200.00 | |
| ☐ | V004 | Variation 4 | | 12-May-2014 | 457.04 | 0.00 | |
| ☐ | V005 | Variation 5 | | 12-May-2014 | 2,452.05 | 0.00 | |
| ☐ | V007 | Variation 7 | | 12-May-2014 | 8,567.07 | 0.00 | |

Number of Records [50 ▼]  ⏮ ◀ 1-5 of 5 ▷ ⏭

FIG. 9

Textura System: Variation Register https://iat.texturallc.net/system/VarReg.psp?projectID=14304&contractID=23619

Home | Log Out

Variation Register

Project: XYZ Apartment Complex
Contract: Design & Construction

Bill Johnson
Johnson General Contracting Co.

Contracts: ABC Electric Co. -44142 Electrical  |  Edit SoV  Contract Status  Approve Progress Claim

| Seq. ID | Period | Number | Title | Description | Submit Date | Submitted Amount | Billed to Date | Approved Amount | Status | Variation # | Private Comment | Assessment |
|---|---|---|---|---|---|---|---|---|---|---|---|---|
| 2 | 5 | V002 | Variation 2 | | 12-May-2014 | 2345.02 | | 2,200.00 | Approved | SV03 | Glazing 4th floor | |
| 3 | 5 | V003 | Variation 3 | | 12-May-2014 | 4567.03 | 4567.03 | 4,500.00 | Approved | SV04 | Includes Var 4 | |
| 4 | 5 | V004 | Variation 4 | | 12-May-2014 | 457.04 | | 0.00 | Rejected | R01 | Budget moved to SV04 | |
| 5 | 5 | V005 | Variation 5 | | 12-May-2014 | 2452.05 | | | Submitted | SV06 | Waiting for design | |
| 7 | 5 | V007 | Variation 7 | | 12-May-2014 | 8567.07 | | | Submitted | | | |
| 10 | 5 | | GC Variation 2 | | 21-July-2014 | | | 100,000.00 | Approved | SV05 | | |

Totals: 30,555.27  15,734.09  117,600.00

Base Contract Value: 100,000.00
Approved Contract Value: 217,600.00
Unapproved Variations: 11,019.12
Proposed Contract Value: 228,619.12

Number of Records 50

Textura System: Enter Request for Payment https://iat.texturallc.net/system/CreateVar.psp?projectID=14304&contractID=66352i Home | Log Out

Enter Request for Payment

Project: XYZ Apartment Complex
Contract: 44142 Electrical
Period: #6 (July)

John Doe
ABC Electric Co.

Save Changes | Progress Claim Number 47023033-10 | Load from File | No Progress Claim This Period | Revert to Saved

| | % Complete | Scheduled Value / Submitted Value | Work Completed This Period / Amt | Total Completed And Stored To Date / Amt | Balance To Finish |
|---|---|---|---|---|---|
| 177 - Stairwell Floor Total | 0.00 | 2,500.00 | 0.00 | 0.00 | 2,500.00 |
| 178 - Linemarking Total | 0.00 | 13,850.00 | 0.00 | 0.00 | 13,850.00 |
| 179 - Floor Epoxy Total | 0.00 | 1,600.00 | 0.00 | 0.00 | 1,600.00 |
| 180 - Touch Ups Total | 0.00 | 68,000.00 | 0.00 | 0.00 | 68,000.00 |
| SC1 - HC-Description Total | 0.00 | 2,000.00 | 0.00 | 0.00 | 2,000.00 |
| SC1 - HC-Description Total | 0.00 | 2,000.00 | 0.00 | 0.00 | 2,000.00 |
| 1236 - Var1236 Total | | Submitted 1,500.00 | | | 1,500.00 |
| 1238 - Additional Materials Total | 50.00 | Submitted 2,000.00 | 0.00 | 1,000.00 | 1,000.00 |
| Unapproved | | 3,500.00 | 0.00 | 1,000.00 | 2,500.00 |
| Approved | | 1,684,000.00 | 0.00 | 283,982.24 | 1,400,017.76 |
| Total | 16.89 | 1,687,500.00 | 0.00 | 284,982.24 | 1,402,517.76 |
| Self Performed | 16.89 | 1,687,500.00 | 0.00 | 284,982.24 | 1,402,517.76 |
| Contracted | 100.00 | 0.00 | 0.00 | 0.00 | 0.00 |

FIG. 11

Textura System: Approve Request for Payment https://iat.texturallc.net/system/CreateVar.psp?projectID=14304&contractID=663521

Home    Log Out

Approve Request for Payment
Project: XYZ Apartment Complex
Contract: Design & Construction
Period: #6 (July)

Bill Johnson
Johnson General Contracting Co.

Approve Selected    Reject Selected
Enter reason if rejecting subcontract progress claim

| Select All | Status | Organization | Unapproved Claims | Scheduled Values | Work Completed This Period | Total Completed and Stored to Date | % Comp | Balance to Finish | SoP Claim | Date Submitted |
|---|---|---|---|---|---|---|---|---|---|---|
| ☐ | Awaiting | Plumbing, Inc. | | 9,482,393.86 | 0.00 | 4,952,531.00 | 52.23 | 4,529,862.86 | | |
| ☐ | Received | Materials & Labor LLC | | 7,446,680.64 | 566,332.20 | 6,655,849.54 | 89.38 | 790,831.10 | | 25-Sep-2014 |
| ☐ | Received | Generic Subcontractor | | 9,779,664.00 | 498,611.70 | 9,183,233.56 | 93.90 | 596,430.44 | | 26-Sep-2014 |
| ☐ | Received | Paving Co. | | 11,169,462.00 | 730,534.00 | 9,750,655.80 | 87.30 | 1,418,806.20 | Yes | 27-Sep-2014 |
| ☐ | Received | Drywall, Inc. | | 10,340,805.00 | 817,068.00 | 9,915,169.00 | 95.88 | 425,636.00 | Yes | 26-Sep-2014 |
| ☐ | Awaiting | ABC Electric Co. | 0.00 | 1,684,000.00 | 0.00 | 283,982.24 | 16.86 | 1,400,017.76 | | |
| ☐ | Received | Insulation, Inc. | | 1,280,000.00 | 27,000.00 | 1,150,000.00 | 89.84 | 130,000.00 | Yes | 22-Sep-2014 |
| ☐ | Received | Insulation, Inc. | | 3,158,340.00 | 668,652.44 | 2,909,503.89 | 92.12 | 248,336.11 | Yes | 24-Sep-2014 |
| | Totals: | | 0.00 | 54,341,345.50 | 3,308,198.34 | 44,800,925.03 | 82.44 | 9,540,420.47 | | |
| | Approved Totals: | | 0.00 | | 0.00 | 0.00 | 100.00 | 0.00 | | |

| PARCEL | ID | TYPE | STATUS | TARGET | Amount |
|---|---|---|---|---|---|
| | 5 | PVRequest | Unsubmitted | NONE | |
| ITEM | 10 | ChangeOrder | Unsubmitted | NONE | $1000 |
| ITEM | 11 | ContractComp | Unsubmitted | NONE | $1000 |

*FIG. 17*

| PARCEL | ID | TYPE | STATUS | TARGET | Amount |
|---|---|---|---|---|---|
| | 5 | PVRequest | Promoted | NONE | |
| ITEM | 10 | ChangeOrder | Promoted | 2046 | $1000 |
| ITEM | 11 | ContractComp | Promoted | 96668 | $1000 |

*FIG. 18*

| PARCEL | ID | TYPE | STATUS | TARGET | Amount |
|---|---|---|---|---|---|
| | 6 | PVResponse | Unmatched | NONE | |
| ITEM | 12 | ChangeOrder | Unmatched | NONE | $1000 |
| ITEM | 13 | ContractComp | Unmatched | NONE | $900 |
| ITEM | 14 | ContractComp | Unmatched | NONE | $100 |

*FIG. 19*

| PARCEL | ID | TYPE | STATUS | TARGET | Amount |
|---|---|---|---|---|---|
| | 6 | PVResponse | Merged | 5 | |
| ITEM | 12 | ChangeOrder | Merged | 10 | $1000 |
| ITEM | 13 | ContractComp | Merged | 11 | $900 |
| ITEM | 14 | ContractComp | Promoted | 96670 | $100 |

*FIG. 20*

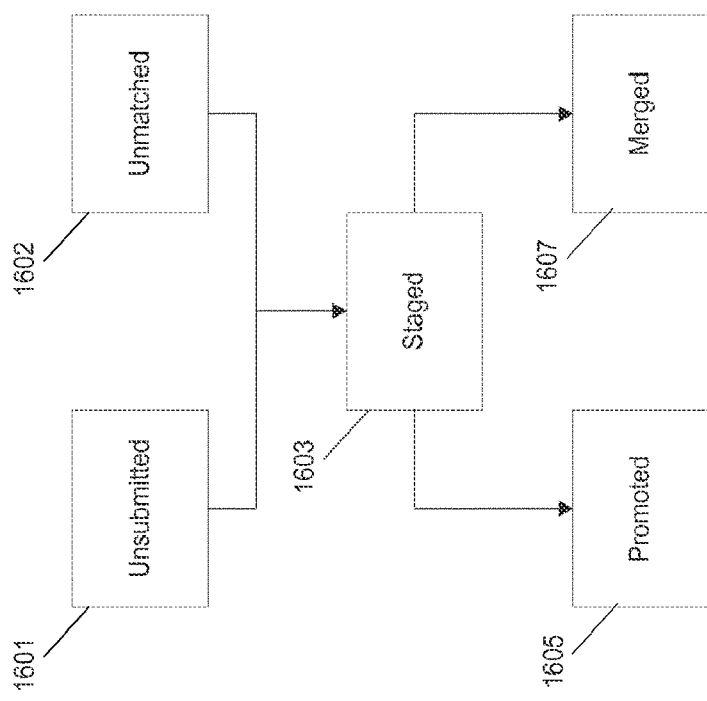

*FIG. 16A*

General Contractor Budget
Total Contract Amount: $4,000,000.00

|    | ID    | TYPE                 | Amount         | Sub-Tier            |
|----|-------|----------------------|----------------|---------------------|
| CC | 44141 | General Construction | $4,000,000.00  | 4 child budget lines |
| BL | 44142 | Electrical           | $500,000.00    | 1 SC Component      |
| BL | 44143 | Plumbing             | $1,500,000.00  | 1 SC Component      |
| BL | 44144 | Materials            | $2,000,000.00  | 1 SC Component      |

FIG. 21

Sub-Contractor Budget
Total Contract Amount: $500,000.00

|    | ID    | TYPE       | Amount       | Sub-Tier            |
|----|-------|------------|--------------|---------------------|
| CC | 44145 | Electrical | $500,000.00  | 1 child budget line |
| BL | 44146 | Electrical | $500,000.00  | 1 SC Component      |

FIG. 22

Sub-Contractor Budget
Total Contract Amount: $501,000.00

|    | ID    | TYPE             | Amount       | Sub-Tier            |
|----|-------|------------------|--------------|---------------------|
| CC | 44145 | Electrical       | $500,000.00  | 1 child budget line |
| BL | 44146 | Electrical       | $500,000.00  | 1 SC Component      |
| CC | 96668 | Potential Change | $1,000.00    | 1 child budget line |
| BL | 96669 | Potential Change | $1,000.00    | 1 SC Component      |

FIG. 23

General Contractor Budget
Total Contract Amount: $4,001,000.00

|    | ID    | TYPE                 | Amount         | Sub-Tier            |
|----|-------|----------------------|----------------|---------------------|
| CC | 44141 | General Construction | $4,000,000.00  | 4 child budget lines |
| BL | 44142 | Electrical           | $501,000.00    | 1 SC Component      |
| BL | 44143 | Plumbing             | $1,500,000.00  | 1 SC Component      |
| BL | 44144 | Materials            | $2,000,000.00  | 1 SC Component      |

*FIG. 24*

Sub-Contractor Budget
Total Contract Amount: $501,000.00

|    | ID    | TYPE       | Amount      | Sub-Tier            |
|----|-------|------------|-------------|---------------------|
| CC | 44145 | Electrical | $500,000.00 | 1 child budget line |
| BL | 44146 | Electrical | $500,000.00 | 1 SC Component      |
| CC | 96668 | GC CC 1    | $900.00     | 1 child budget line |
| BL | 96669 | GC CC 1    | $900.00     | 1 SC Component      |
| CC | 96670 | GC CC 2    | $100.00     | 1 child budget line |
| BL | 96670 | GC CC 2    | $100.00     | 1 SC Component      |

*FIG. 25*

Sub-Contractor Budget
Total Contract Amount: $501,000.00

|    | ID    | TYPE       | Amount      | Sub-Tier            |
|----|-------|------------|-------------|---------------------|
| CC | 44145 | Electrical | $500,000.00 | 1 child budget line |
| BL | 44146 | Electrical | $500,000.00 | 1 SC Component      |
| CC | 96668 | GC CC 1    | $1000.00    | 1 child budget line |
| BL | 96669 | GC CC 1    | $1000.00    | 1 SC Component      |
| CC | 96670 | GC CC 2    | $0.00       | 1 child budget line |
| BL | 96670 | GC CC 2    | $0.00       | 1 SC Component      |

*FIG. 26*

|        | ID | TYPE        | STATUS      | TARGET | Amount |
|--------|----|-------------|-------------|--------|--------|
| PARCEL | 5  | PVRequest   | Unsubmitted | NONE   |        |
| EVENT  | 10 | ChangeOrder | Unsubmitted | NONE   | $1000  |
| EVENT  | 11 | ContractComp| Unsubmitted | NONE   | $1000  |

FIG. 27

|        | ID | TYPE        | STATUS   | TARGET | Amount |
|--------|----|-------------|----------|--------|--------|
| PARCEL | 5  | PVRequest   | Promoted | NONE   |        |
| EVENT  | 10 | ChangeOrder | Promoted | 2046   | $1000  |
| EVENT  | 11 | ContractComp| Promoted | 96668  | $1000  |

FIG. 28

|        | ID | TYPE        | STATUS    | TARGET | Amount |
|--------|----|-------------|-----------|--------|--------|
| PARCEL | 6  | PVResponse  | Unmatched | NONE   |        |
| EVENT  | 12 | ChangeOrder | Unmatched | NONE   | $1000  |
| EVENT  | 13 | ContractComp| Unmatched | NONE   | $1000  |

FIG. 29

|        | ID | TYPE        | STATUS | TARGET | Amount |
|--------|----|-------------|--------|--------|--------|
| PARCEL | 6  | PVResponse  | Merged | 5      |        |
| EVENT  | 12 | ChangeOrder | Merged | 10     | $1000  |
| EVENT  | 13 | ContractComp| Merged | 11     | $1000  |

FIG. 30

Sub-Contractor Budget
Total Contract Amount: $501,000.00

|    | ID    | TYPE       | Amount       | Sub-Tier            |
|----|-------|------------|--------------|---------------------|
| CC | 44145 | Electrical | $500,000.00  | 1 child budget line |
| BL | 44146 | Electrical | $500,000.00  | 1 SC Component      |
| CC | 96668 | GC CC 1    | $1,000.00    | 1 child budget line |
| BL | 96669 | GC CC 1    | $1,000.00    | 1 SC Component      |

| PARCEL | ID | TYPE | STATUS | TARGET | Amount |
|---|---|---|---|---|---|
| EVENT | 5 | PVRequest | Unsubmitted | NONE | |
| EVENT | 10 | ChangeOrder | Unsubmitted | NONE | $1000 |
| EVENT | 11 | ContractComp | Unsubmitted | NONE | $1000 |

FIG. 33

| PARCEL | ID | TYPE | STATUS | TARGET | Amount |
|---|---|---|---|---|---|
| EVENT | 5 | PVRequest | Promoted | NONE | |
| EVENT | 10 | ChangeOrder | Promoted | 2046 | $1000 |
| EVENT | 11 | ContractComp | Promoted | 96668 | $1000 |

FIG. 34

| PARCEL | ID | TYPE | STATUS | TARGET | Amount |
|---|---|---|---|---|---|
| EVENT | 6 | PVResponse | Unmatched | NONE | |
| EVENT | 12 | ChangeOrder | Unmatched | NONE | $0 |
| EVENT | 13 | ContractComp | Unmatched | NONE | $0 |

FIG. 35

| PARCEL | ID | TYPE | STATUS | TARGET | Amount |
|---|---|---|---|---|---|
| EVENT | 6 | PVResponse | Merged | 5 | |
| EVENT | 12 | ChangeOrder | Merged | 10 | $0 |
| EVENT | 13 | ContractComp | Merged | 11 | $0 |

Sub-Contractor Budget
Total Contract Amount: $500,000.00

| | ID | TYPE | Amount | Sub-Tier |
|---|---|---|---|---|
| CC | 44145 | Electrical | $500,000.00 | 1 child budget line |
| BL | 44146 | Electrical | $500,000.00 | 1 SC Component |
| CC | 96668 | GC CC 1 | $0.00 | 1 child budget line |
| BL | 96669 | GC CC 1 | $0.00 | 1 SC Component |

FIG. 36

VARIATIONS MANAGEMENT

BACKGROUND

The present disclosure relates to systems and methods for tracking and managing budgets. In particular, the systems described herein process and track variations to established budgets for construction projects and control invoicing and payment processing accordingly.

SUMMARY

Systems and methods are provided that embody an improved electronic process by which a contractor can initiate a proposed variation to a project contract and request payments against the proposed variation even before the variation is approved by the other party to the project contract. In some implementations, the improved electronic process allows the contractor to receive a payment before the variation is approved by implementation of an electronic matching process between the proposed variation generated by the contractor and an assessed variation generated by the other party. A data structure representative of the proposed variation is generated and maintained as the proposed variation is reviewed, approved, and elevated to become part of the actual budget for the project (e.g., as a new contract component). Because the same data structure is maintained throughout the process and after the proposed variation is approved, payment requests, payments, and any other actions taken against the data structure before the proposed variation is approved are automatically linked to the actual budget after approval and, thereby, are recognized and processed by external accounting systems as though the variations were created by the other party to the contract.

In one embodiment, a method is provided for processing a variation of a construction project contract between a contractor and a second party for work to be performed on a construction project by the contractor for the second party. In some embodiments, the second party is a general contractor for the construction project and the contractor is a subcontractor hired by the general contractor. A request object data structure is generated by a computer-based system in response to receiving a proposed variation of the construction project contract initiated by the contractor. The request object includes a first new contract component item and, in some embodiments, multiple new contract component items. The first new contract component item of the request object includes an item ID field identifying an item ID of the first new contract component item, a target field identifying a memory location for a new contract component in a contract budget data structure, and a proposed value field identifying a proposed value for the new contract component. The request object is stored on a non-transitory computer-readable memory of the computer-based system and a copy is transmitted to an external system associated with the second party (e.g., the general contractor). The system then receives a response object indicative of an assessed variation of the construction project contract from the external system. Like the request object, the response object includes a first new contract component item and possibly multiple new contract component items. The first new contract component item of the response object includes a target field and an approved value field identifying an approved value for the new contract line item. A match instruction identifies the request object and the response object as both corresponding to the same proposed variation initiated by the contractor and the target field of the first new contract component item of the response object is automatically updated to include the item ID of the first new contract component item of the corresponding request object. The contract budget data structure is then updated to include the new contract line item at the memory location identified by the target field of the first new contract component item of the request object. A cost value associated with the new contract line item is defined based on the approved value from the response object.

In some such embodiments, the assessed variation may include either an approved variation or an unapproved variation. An approved variation becomes a part of the approved contract budget and the second party can approve the variation at the value proposed by the contractor, edit the proposed variation value or structure, or reject the proposed variation by setting the budget value to zero. An unapproved variation can be matched to the proposed variation, but does not become a part of the approved contract budget. Instead, the unapproved variation serves as an acknowledgement that the proposed variation has been recognized by the external system. In some embodiments, the system allows the second party to approve payments that have been requested against proposed variations as long as the proposed variation has been matched to an unapproved variation from the external system.

In another embodiment, a method is provided for processing budget variations on a computer-based budget management system. A contract budget data structure is stored on a non-transitory computer-readable memory. The contract budget data structure includes a total contract budget amount, a plurality of contract budget line item objects, and a line item value for each contract budget line item object. A request for payment for work performed by a first user on the project that corresponds to one or more budget line item objects is received from the first user and includes a reference to the appropriate contract budget line items. A request for a new variation to the total contract budget amount of the contract budget data structure can also be received from the first user and, in response, the system generates a proposed budget variation data structure. The proposed budget variation data structure includes at least one contract component item. Each contract component item in the proposed budget variation data structure includes an item ID and a value of a proposed new contract budget line item object to be added to the contract budget data structure. After the proposed budget variation data structure is created, the first user can initiate requests for payment for work performed by the first user that reference the proposed new budget variation data structure instead of referencing a budget line item object from the contract budget data structure.

In some embodiments, requests for payment that reference the proposed new budget variation data structure can be received even before the proposed variation is reviewed and approved by the other party to the contract. However, in other embodiments, the proposed new budget variation data structure must be matched to a corresponding assessed budget variation data structure created by a second user responsible for paying the first user before the request for payment can be approved.

Other aspects of the invention will become apparent by consideration of the detailed description and accompanying drawings.

BRIEF DESCRIPTION OF THE DRAWINGS

FIG. 6 is a screen-shot of a graphic user interface displayed to a subcontractor for receiving proposed variations in the system of FIG. 1.

FIG. 7 is a screen-shot of a graphic user interface displaying a list of proposed and approved budget variations to a subcontractor using the system of FIG. 1.

FIG. 9 is a screen-shot of a graphic user interface displayed to a general contractor for matching assessed variations to proposed variations in the system of FIG. 1.

FIG. 10 is a screen-shot of a graphic user interface displaying a list of proposed and approved budget variations to a general contractor using the system of FIG. 1.

FIG. 11 is a screen-shot of a graphic user interface displayed to a subcontractor and used to enter a request for payment using the system of FIG. 1.

FIG. 12 is a screen-shot of a graphic user interface displayed to a general contractor and used to approve requests for payment received from subcontractors using the system of FIG. 1.

FIG. 13 is a screen-shot of a graphic user interface displayed to a general contractor and used to modify requests for payment received from subcontractors prior to payment using the system of FIG. 1.

FIG. 16A is flow chart of a data life cycle for request objects corresponding to proposed variations and response objects corresponding to assessed variations in the system of FIG. 1A.

FIG. 17 is a representation of a request object data structure generated by the system of FIG. 1A in response to receiving a proposed variation from a subcontractor in a first example.

FIG. 18 is a representation of the request object data structure of FIG. 17 after the proposed variation is submitted by the subcontractor in the first example.

FIG. 19 is a representation of a response object data structure generated by the ERP system and received by the CPMS in the system of FIG. 1A in the first example.

FIG. 20 is a representation of the response object data structure of FIG. 19 after the response object data structure is matched and merged with the request object data structure of FIG. 18 in the first example.

FIG. 21 is a representation of an initial stored general contractor budget data structure in the system of FIG. 1A in the first example.

FIG. 22 is a representation of an initial stored subcontract budget data structure that corresponds to a line item from the general contract budget data structure of FIG. 21 in the first example.

FIG. 23 is a representation of the stored subcontract budget data structure of FIG. 22 after the request object data structure of FIG. 18 is promoted in the first example.

FIG. 24 is a representation of the stored general contract budget data structure of FIG. 21 after the response object data structure of FIG. 20 is processed by the system of FIG. 1A in the first example.

FIG. 25 is a representation of the stored subcontract budget data structure of FIG. 23 after the response object data structure of FIG. 20 is received and processed by the system of FIG. 1A in the first example.

FIG. 26 is an alternative representation of the stored subcontract budget data structure of FIG. 25 if a claim for payment is submitted by the subcontractor against the proposed variation before the response object data structure of FIG. 20 approving the proposed variation is received and processed by the system of FIG. 1A in the first example.

FIG. 27 is a representation of a request object data structure generated by the system of FIG. 1A in response to receiving a proposed variation from a subcontractor in a second example.

FIG. 28 is a representation of the request object data structure of FIG. 27 after the proposed variation is submitted by the subcontractor in the second example.

FIG. 29 is a representation of a response object data structure generated by the ERP system and received by the CPMS in the system of FIG. 1A in the second example.

FIG. 30 is a representation of the response object data structure of FIG. 29 after the response object data structure is matched and merged with the request object data structure of FIG. 28 in the second example.

FIG. 31 is a representation of a stored subcontract budget data structure after the response object data structure of FIG. 30 approving the proposed variation is received and processed by the system of FIG. 1A in the second example.

FIG. 32 is a representation of a request object data structure generated by the system of FIG. 1A in response to receiving a proposed variation from a subcontractor in a third example.

FIG. 33 is a representation of the request object data structure of FIG. 32 after the proposed variation is submitted by the subcontractor in the third example.

FIG. 34 is a representation of a response object data structure generated by the ERP system and received by the CPMS in the system of FIG. 1A in the third example.

FIG. 35 is a representation of the response object data structure of FIG. 34 after the response object data structure is matched and merged with the request object data structure of FIG. 33 in the third example.

FIG. 36 is a representation of a stored subcontract budget data structure after the response object data structure of FIG. 35 approving the proposed variation is received and processed by the system of FIG. 1A in third example.

DETAILED DESCRIPTION

Figure 1A:
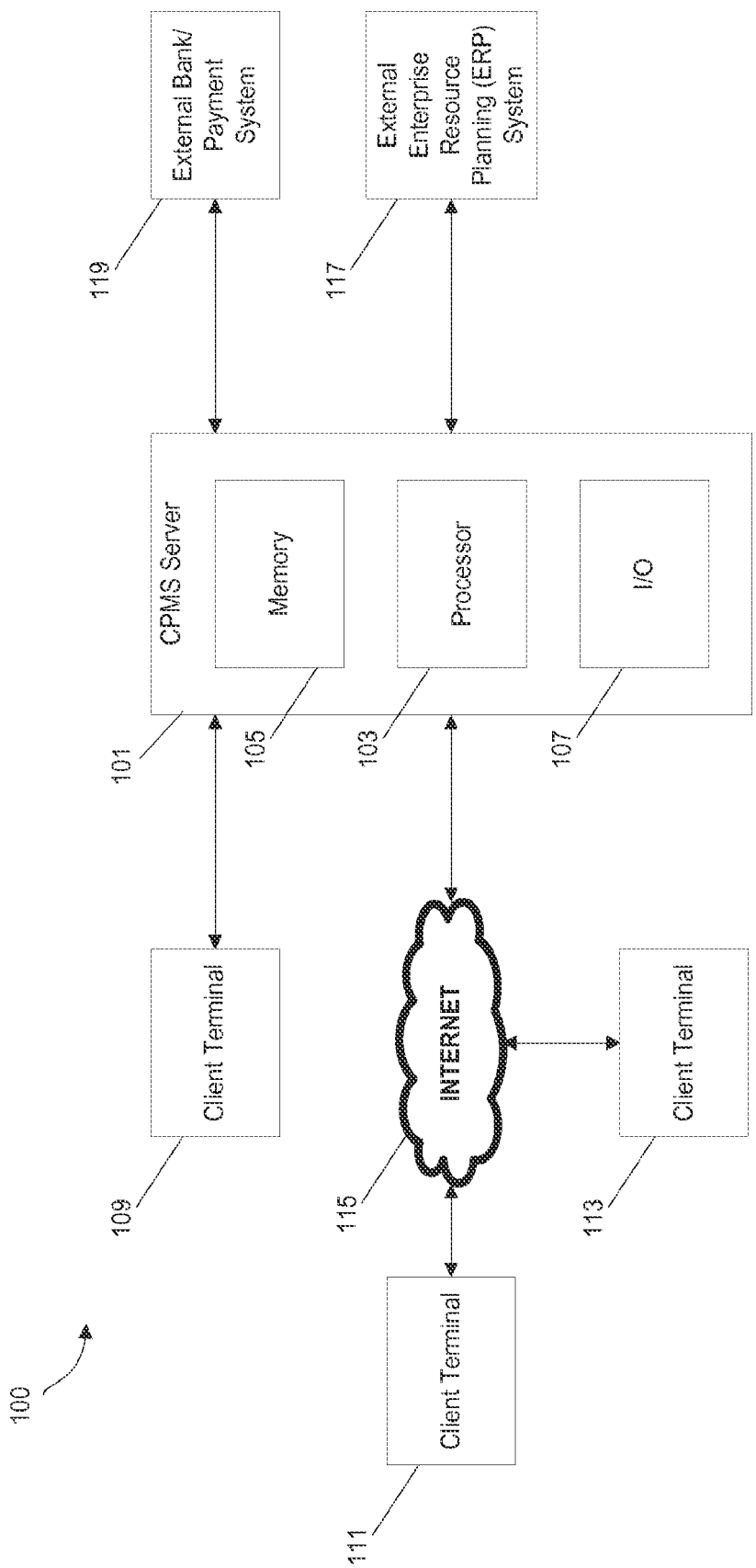
FIG. 1A is a block diagram of a construction payment management system with variations management functionality according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Furthermore, it is to be understood that the specific terminology for construction project interactions and documentation varies between different jurisdictions, specific context, and participant preference. For example, a project participant can submit a request for payment that includes an "invoice," a "progress claim," a "payment application," a "billing," or a "draw package." In some countries and on some projects, payments are made in batches at the end of a defined payment period in a process called a "draw." However, the examples discussed below in the context of a "draw" could readily be adapted to other types of structured payment periods or unstructured intermittent payments. Similarly, depending on the context and agreed upon practice, the term "variation" may be interchanged with, for example, "change order," "variation order," or "purchase order." Likewise, the examples described herein refer to "general contractors" and "subcontractors." It is understood that these project participants have other titles in some contexts and locales. For example, a "general contractor" may be interchangeably referred to as a "head contractor" or "main contractor." In the same way, in some contexts, terms such as "contract line item" and "contract component" can be used interchangeably. Finally, the term budget is meant to broadly refer to various components and interactions used to establish financial forecasting, planning, and constraints for a project. As such, unless otherwise specified, the term "budget" should be interpreted broadly to include a "schedule of values," "work breakdown," "work breakdown structure," and/or "line item detail" or, in some contexts, can be used interchangeably with such terms. To the extent that these and other terms that may be unique to local verbiage and custom or interchangeably subject to industry preference are used herein, they are to be interpreted broadly enough to include any corresponding terms for similar corresponding interactions and documentation as would be appropriate in the construction, banking, and real property industries.

FIG. 1A illustrates a network-based computer system 100 for concurrently managing a construction project payment process for multiple construction projects involving multiple participants. A construction payment management system ("CPMS") server 101 includes a processor 103 and a memory 105 storing instructions that are executed by the processor 103 to provide the system functionality described below. The memory 105 includes one or more non-transient computer readable memories such as, for example, a hard disk, Flash memory, or other types of RAM and ROM memory units. The processor 103 can include a variety of commercially available processing units including one or more of a microprocessor, microcontroller, PC computer processor, multiple core pipelined processors, or parallel processing system controllers.

The CPMS server 101 communicates with a variety of other networked systems through an input/output ("I/O") module 107. For example, a user can access the CPMS server 101 through a client terminal 109 that is directly connected to the CPMS server 101 or connected to the CPMS server 101 through a local area network. Alternatively or in addition, client terminals 111, 113 can access the CPMS server 101 through the Internet 115. Client terminals 109, 111, 113 can be implemented in a variety of ways including, for example, dedicated terminals specifically designed to interface with the CPMS server 101 and desktop computers that access the CPMS server 101 through a web-page interface or through a software program running on the desktop computer.

The CPMS server 101 is also configured to interface with a variety of external project and budget management systems. For example, CPMS server 101 can be communicatively coupled (either directly or via an Internet connection) to a general contractor's external Enterprise Resource Planning ("ERP") system 117. A general contractor can use this external ERP system 117 to plan and track project budgets, allocate resources and equipment, process payments, and track project status. Some of the functionality of the ERP system 117 interacts with the functionality provided by the CPMS server 101.

The CPMS server 101 is also configured to interface with one or more external banking/payment systems 119. In this way, the CPMS server 101 can send payment instructions to banking systems 119 in response to requests for payment (e.g., invoices, progress claims, etc.) that are generated, processes, and approved through the CPMS server 101.

Examples of CPMS systems such as the one illustrated in FIG. 1A are described in further detail in U.S. Pat. No. 7,925,584, the entire contents of which are incorporated herein by reference. Although the example of FIG. 1A shows the CPMS server 101 as a single unit with a single processor 103 and memory 105, in some implementations, the CPMS server 101 may include a computer server with multiple parallel processing cores, a computer server with multiple internal memory units, a computer server interacting with multiple external memory units (or cloud-based storage), or a series of multiple networked computer servers. As such, unless otherwise specified, the phrases and terminology used herein should be interpreted to include single physical components or multiple physical components. For example, the phrase "memory" as used herein may include a single memory unit or multiple separate memory units, the term "processor" as used herein may include a single processor or multiple separate processors, the term "CPMS server" as used herein may include a single server implementation or multiple networked servers, and the term "CPMS" as used herein may include a single computer (e.g., CPMS server 101) or multiple networked computer systems (e.g. CPMS server 101 and client terminals 109, 111, 113).

Figure 1B:
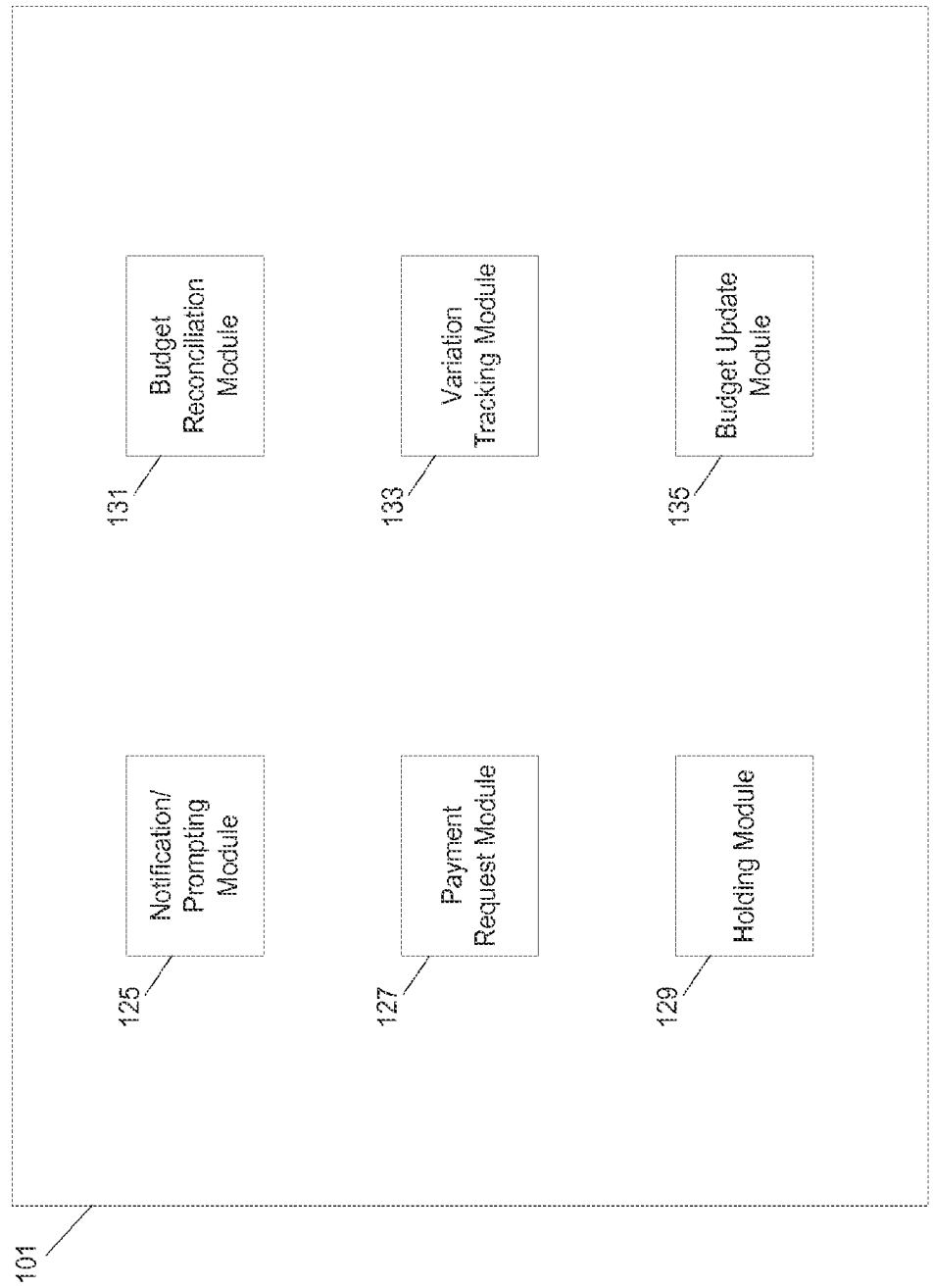
FIG. 1B is a block diagram of various modules implemented by the construction payment management system of FIG. 1.

The CPMS 101 is configured to implement a series of modules that provide the functionality described in the examples herein. For example, as illustrated in FIG. 1B, the CPMS 101 implements a notification/prompting module 125, a payment request module 127, a holding module 129, a budget reconciliation module 131, a variation tracking module 133, and a budget update modules 135. As described in further detail below, through the notification/prompting module 125, the CPMS 101 detects the occurrence of certain events or actions on the CPMS 101 and generates a notification to be displayed to one or more users—for example, as an email sent to a specific email address stored on memory and associated with a particular user and/or as a textual notification to be displayed on the user's project home page screen. Where further action is required by the user being notified, the notification/prompting module includes text or a selectable link in the notification instructing the notified user to perform one or more required actions.

Through the payment request module 127, the CPMS 101 solicits and collects payment request information from system users and communicates the payment request to another user for review and/or approval. The holding module 129 temporarily holds and stores requests and documents that are not yet ready for processing/approval.

Through the budget reconciliation module 131, the CPMS 101 stores and maintains various budget data for users associated with a project. As discussed in further detail below, the variation tracking module 133 tracks the status of proposed and assessed variations. Among other things, the budget update module 135 updates stored budget data structures based on approved variations and modified schedules of values from users.

The modules illustrated in FIG. 1B are examples and various actual implementations of CPMS servers 101 may be configured to implement additional modules, fewer modules, or alternative modules. In this example, each module is implemented as a series of software instructions executed by a processor to cause the CPMS 101 to function in a prescribed manner. Each module may be implemented as separate sections of stored computer instructions executed by a single processor on a single computer or by a plurality of processors on one or more computer servers. Furthermore, in some implementations, at least some modules may be implemented as a single dedicated processor executing only instructions associated with a single module.

Figure 1C:
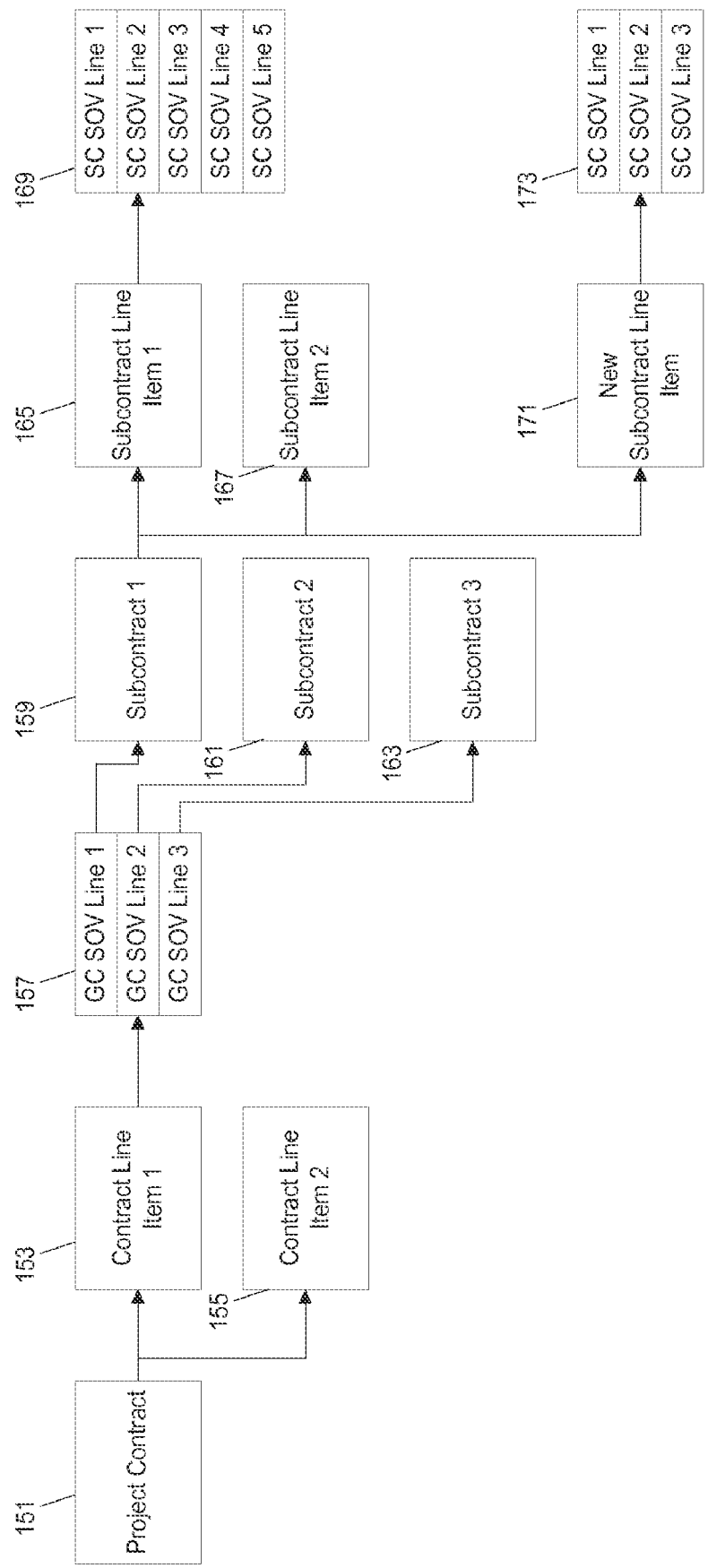
FIG. 1C is a block diagram of a hierarchically tiered contract/budget structure stored on a memory of the construction payment management system of FIG. 1A.

The CPMS server 101 stores and maintains hierarchical contract/budget information for each construction project managed by the system. The CPMS server 101 also facilitates payments according to the contracts and budgets stored and maintained thereon. FIG. 1C illustrates an example of one such hierarchically structured project budget stored on and maintained by the CPMS server 101. Each project is defined at the highest level by a project contract 151 which indicates the total overall cost for a project. The general project contract 151 is further defined by a series of general contract line items 153, 155. The general contractor may define a schedule of values (SOV) 157 for each contract line item 153. The schedule of values includes one or more SOV line items (e.g., GC SOV Line 1, GC SOV Line 2, and GC SOV Line 3).

For example, a general contractor may divide the work associated with the project into work types and define separate general contract line items for electrical, plumbing, materials, etc. and define a value (i.e., a portion of the overall project value) to each category. The GC schedule of values 157 corresponding to the "electrical" contract line item 153 may further include multiple SOV line items as shown in FIG. 1C. Alternatively, the GC may contract with an electrical subcontractor to provide all electrical work for a project. In such cases, the GC schedule of values 157 for contract line item 153 may only include a single GC SOV Line item. Furthermore, in some implementations, the general project contract only includes a single total value and, instead of defining a plurality of contract line items, the general contractor defines a plurality of SOV line items directly based on the total project contract value—hereby omitting the "contract line item" tier as illustrated in FIG. 1C (i.e., contract line items 153, 155).

Each SOV line item in the GC SOV 157 identifies either a direct cost incurred by the general contractor (i.e., materials and labor provided directly by the GC) or corresponds to a subcontract between the general contractor and one or more subcontractors or materials suppliers (e.g., subcontract 159, subcontract 161, and subcontract 163). The work and materials associated with a particular subcontract are further defined by one or more subcontract line items 165, 167. A subcontractor is linked to the project through one or more particular subcontracts and the subcontractor is then able to create a schedule of values for each subcontract line item—for example, SOV 169 is created by the subcontractor for subcontract line item 165. The subcontractor SOV 169 includes one or more SOV line items that correspond to specific tasks performed by or materials provided by the subcontractor for the subcontract line item 165. Furthermore, each SC SOV line item may further correspond to another subcontract between the subcontractor and a further sub-tier contractor, thereby implementing a multi-tiered hierarchically structured project and budget system. Alternatively, one or more individual subcontract line items may be directly linked to a GC SOV Line item. In such implementations, the subcontract (i.e., subcontract 159, 161, 163) does not serve as an intermediate tier in the budget hierarchy. Instead, the subcontracts each define one or more subcontract line items which are then linked directly to a GC SOV line item.

If, during the course of the project, the subcontractor discovers that their costs will exceed the agreed upon value in a particular subcontract 159 or if additional work or materials are necessary, the subcontractor may request a variation of the terms of the subcontract. In the examples described herein, an approved variation issued by the general contractor causes a new subcontract line item 171 with a defined value to be added to a subcontract 157. The Subcontractor is then able to define a new SOV 173 corresponding to the new subcontract line item 171. Because, in most cases, the addition of this new subcontract line item 171 alters the total value of the subcontract 159, the general contractor may decide to request a corresponding variation to the project contract 151.

Although the examples and systems discussed herein focus on variations that result in the addition of a new subcontract line item, other systems may be configured to create an entirely new subcontract in response to an approved variation request. Furthermore, variations may be similarly processed at other tiers throughout a multiple tiered construction project. For example, the addition of a new contract line item at a sub-of-sub-contractor tier may cause the subcontractor to request a corresponding adjustment and, ultimately, may cause the general contractor to request a similar adjustment.

The example of FIG. 1C illustrates one specific type of hierarchical contract budget arrangement. However, the systems and methods described herein can be adapted to other hierarchical contract and/or budget arrangements. They may also be adapted to manage and modify a single contract between two parties without any further hierarchical tiers. The examples discussed below may at times make reference to the specific arrangement of FIG. 1C and at other times make more general reference to a contract budget data structure. Unless otherwise specified, the term contract budget data structure should be interpreted to include any data structure that defines budgetary information related to a contractual agreement between two parties that is modified to reflect changes to the contractual agreement.

Figure 2:
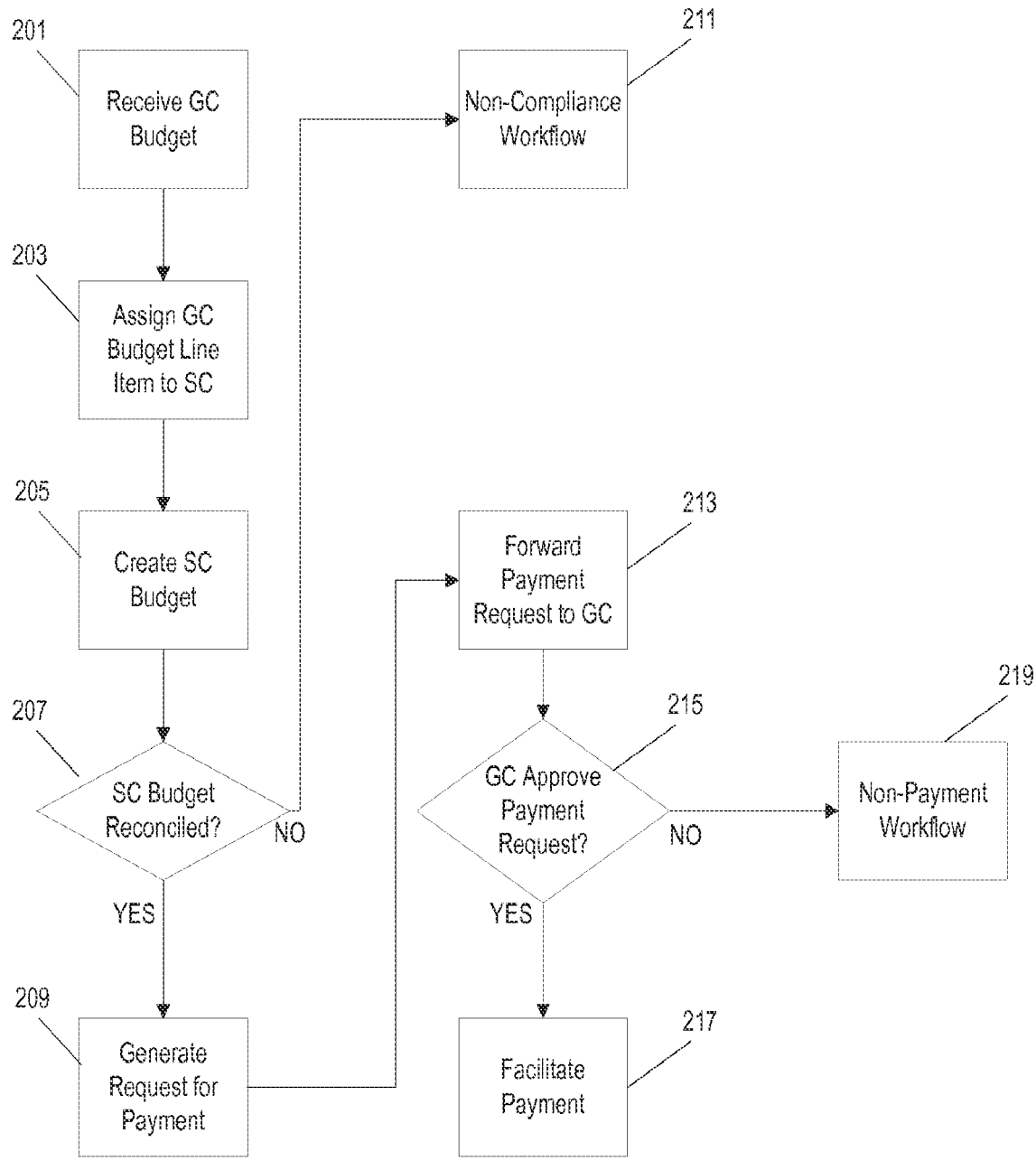
FIG. 2 is a flow chart of a method for processing payments according to an established contract/budget implemented on the system of FIG. 1.

FIG. 2 illustrates one example of a method for processing payments using the system of FIG. 1. The CPMS server 101 receives project contract and budget information from the general contractor's ERP system 117 (step 201) and individual SOV line items become associated with (or assigned to) specific subcontractors through one or more subcontracts (step 203). It is noted that, although the examples described below may refer specifically to interactions between a general contractor and a subcontractor, the functionality and mechanisms described in these examples can be provided to any combination of participants in a construction project where one participant is contracted to perform work or provide materials and another is responsible for overseeing and paying the first participant. For example, the subcontractor-general contractor dynamic described in the examples below can be equally applied to various other combinations of participants including, but not limited to, a general contractor-to-project owner, material supplier to subcontractor, sub-of-subcontractor to subcontractor, material supplier to general contractor, etc.

After an individual SOV line item from the general contractor is assigned to the subcontractor (step 203) by a subcontract (i.e., by a subcontract line item), the subcontractor further defines a subcontractor budget by creating a SOV for each subcontract line item (step 205). The CPMS server 101 ensures that the subcontractor budget is reconciled (step 207), for example, by ensuring that the total value of the SC SOV line items is equal to the corresponding value of the subcontract line item. The subcontractor defined budget information can be generated, for example, by the CPMS server 101 or by the subcontractor's ERP system interacting with the CPMS server 101.

If the subcontractor budget is properly reconciled (step 207), the CPMS server 101 allows the subcontractor to generate requests for payment corresponding to approved subcontract line items (step 209). If the subcontractor budget is not reconciled, the CPMS server 101 implements a non-compliance workflow (step 211) that, among other things, prevents the subcontractor from creating requests for payments. Further details and other examples of non-compliance workflows are described in U.S. Pat. No. 7,925,584, which has been incorporated by reference above, and U.S. Patent Publication No. 2008/0281735, the entire contents of which are incorporated herein by reference.

If the subcontractor budget is properly reconciled (step 207) and the subcontractor generates a request for payment associated with an approved subcontract line item, then the CPMS server 101 forwards the payment request to the general contractor for review (step 213). If the general contractor approves the request for payment (step 215), the CPMS server 101 initiates a workflow to facilitate payment to the subcontractor (step 217). As described in further detail in U.S. Pat. No. 7,925,584, which has been incorporated by reference above, the CPMS server 101 can facilitate payment by sending a payment instruction electronically to an external banking system, printing a check, or other mechanisms.

If, however, the general contractor does not approve the payment request, the CPMS server 101 implements a non-payment workflow (step 219) where the subcontractor may be notified of the unapproved (or edited) invoice. In some embodiments, the CPMS server 101 receives notations or comments from the general contractor explaining why the request for payment was rejected. These comments are displayed to the subcontractor and stored to the memory for future access and record-keeping. In some embodiments, the non-payment workflow can include an extended editing process where the general contractor and subcontractor are able to alternatingly make edits to the invoice until a mutually agreeable payment strategy is agreed upon. U.S. Pat. No. 8,306,883, the entire contents of which are hereby incorporated by reference, describes one example of such a system.

Figure 3:
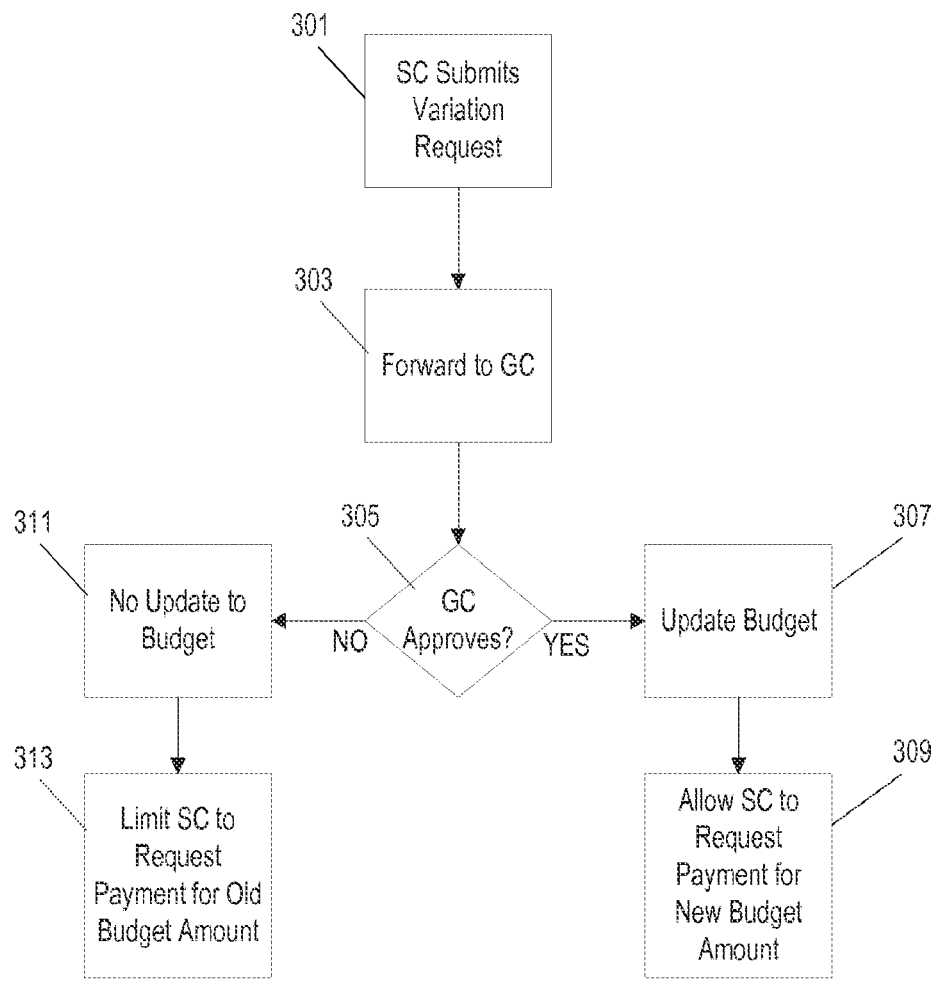
FIG. 3 is a flow chart of one method for processing subcontract variations proposed by a subcontractor using the system of FIG. 1.

As discussed above in reference to FIG. 1C, in some circumstances, it becomes necessary for the terms of an agreed contract/budget to be altered. For example, the cost of materials may be more than initially estimated or logistic concerns may have extended or delayed the construction activities of the subcontractor. FIG. 3 illustrates one example of how a subcontractor can request a modification (or "variation") to the approved budget for the construction project by using the CPMS server 101. The subcontractor initiates a variation request (step 301) and the CPMS server 101 forwards the request to the general contractor (step 303). The general contractor reviews the variation request, either through the CPMS server 101 or through the general contractor's external ERP system, and determines whether to approve or reject the variation request (step 305).

If the variation request is approved, the CPMS server 101 updates the appropriate subcontract (for example, by adding a new subcontract line item) (step 307). The subcontractor is then able to request payments through the CPMS server 101 for the new budget amount (step 309). However, if the change order request is rejected, no update is made to the contract/budget (step 311) or, in some implementations, the budget is updated to reflect the proposed variation, but is assigned a value of $0 instead of the amount requested by the subcontractor as described in further detail below. In either case, the subcontractor's ability to request a payment using the CPMS server 101 is restricted by the previously established budget amounts (step 313) and the subcontractor may be prevented from requesting any payments if the subcontractor's budget is not properly reconciled with the terms of the applicable subcontract.

Figure 4A:
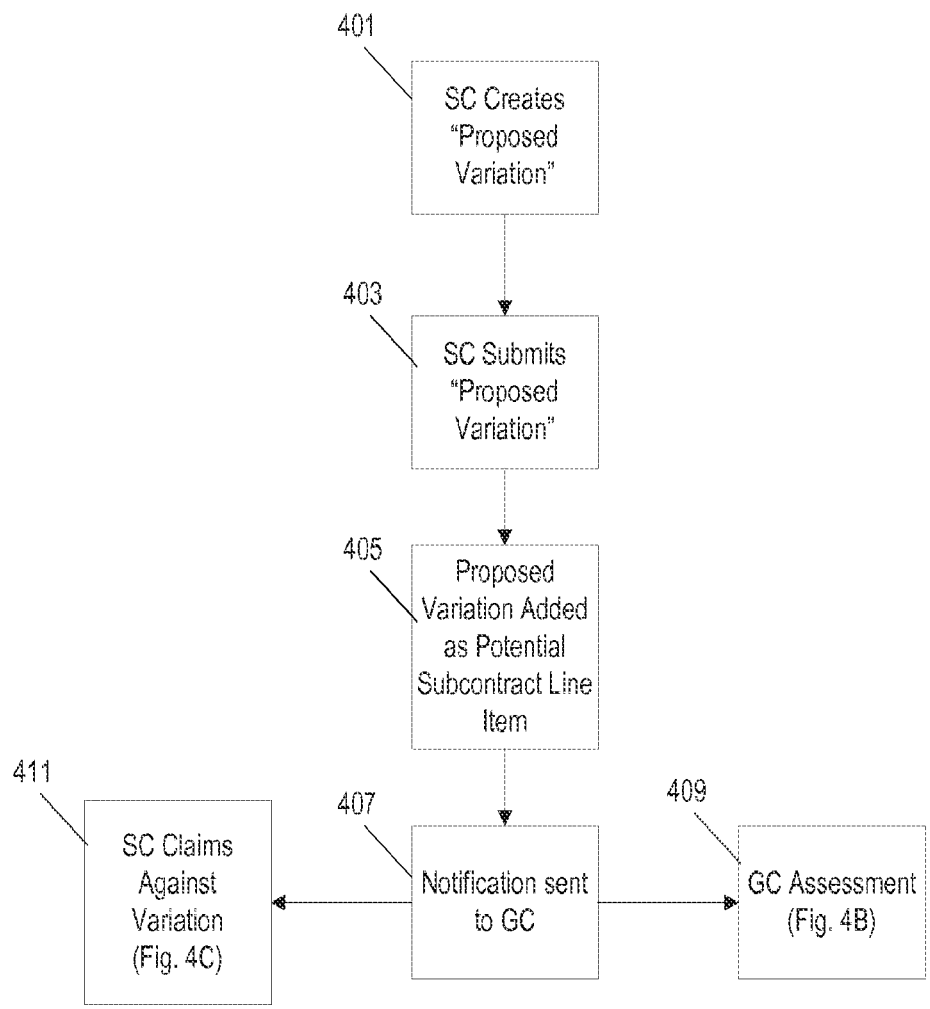
FIG. 4A is a flow chart of another method for processing subcontract variations proposed by the subcontractor using the system of FIG. 1.

FIG. 4A illustrates an alternative mechanism by which the CPMS server 101 can process budget variation requests and even allow the subcontractor to create a new SC SOV and to request payments for the new proposed budget amount before the budget variation is approved by the general contractor. In some implementations, the CPMS server 101 is configured to provide the functionality of only FIG. 3 or only FIG. 4A. Alternatively, the CPMS server 101 can be configured to provide the functionality of either FIG. 3 or FIG. 4A based on factors such as, for example, general contractor preference settings, project location, or project type. In the examples described below, the processing functionality of FIG. 3 is referred to as "Standard Variations Processing" and the functionality of FIG. 4A is referred to as "Enhanced Variations Processing."

Figure 5:
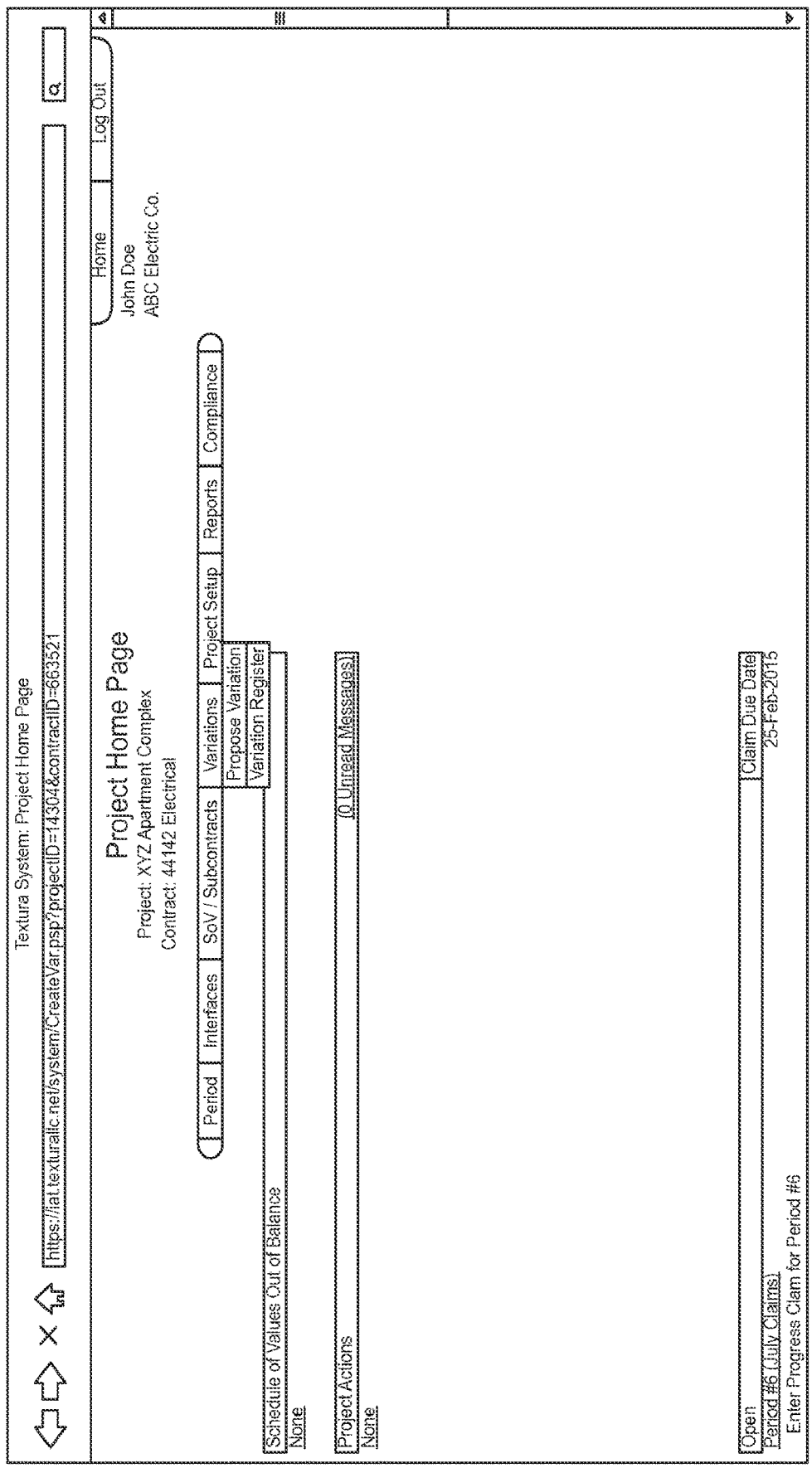
FIG. 5 is a screen-shot of a project home page displayed to a subcontractor using the system of FIG. 1.

In enhanced variation processing as illustrated in FIG. 4A, the subcontractor creates a "proposed variation," which, if approved, would be added as a new subcontract line item (step 401). FIG. 5 illustrates an example of a web-based user interface that is displayed to the subcontractors on a terminal device accessing the CPMS server. The subcontractor is able to select "Propose Variation" or "Variation Register" from a drop-down menu. FIG. 6 shows the user interface that is displayed to the subcontractor when "Propose Variation" is selected. The subcontractor uses the form to assign a number, title, description, and amount to a new proposed variation. Other procedural data, such as a date, are assigned based on the time and context of the submission. New proposed variations remain listed on this screen and are editable by the subcontractor until they are formally submitted by the subcontractor (FIG. 4A, step 403). In the example of FIG. 6, the subcontractor submits the proposed variation by selecting the corresponding check-box on the left of the interface list and clicking the "submit selected" button. Alternatively, the subcontractor can select "save draft" prior to submitting the proposed variation and retain the ability to make further edits to the proposed variation.

Once submitted by the subcontractor (FIG. 4A, step 403), the proposed variation becomes locked and the subcontractor is no longer able to edit the details of the proposed variation. The subcontractor can still view the submitted proposed variations and monitor the status of the proposed variation by selecting the "Variations Register" option on the home screen of FIG. 5. FIG. 7 illustrates an example of a "Variations Register" screen that is displayed to the subcontractor. The Variations Register screen lists all submitted proposed variations by number, title, description, submit date, and submitted amount.

As discussed in further detail below, embodiments provide an improved electronic process by which each proposed variation will be assessed by the general contractor before it can be included as a part of the actual subcontract budget. The three columns to the right of the interface labeled "Assessment" provide information regarding the status and outcome of the general contractor's assessment of each proposed variation. For example, if the proposed variation has been approved, the assessment "status" column shows the variation as "approved" and includes an "approved amount." If a proposed variation has been rejected (e.g., Variation 4 of FIG. 7), the Variations Register reflects an approved amount of $0.00 for the variation. If the proposed variation has not yet been approved or rejected, the assessment "status" column shows the proposed variation as "submitted" in the Variations Register. The assessment "variation #" column identifies an identification number assigned to the variation by the general contractor's ERP system. If the general contractor has not yet acknowledged the proposed variation (as discussed further below), no assessment variation number is assigned to the proposed variation (e.g., Variation 7). However, if the general contractor's ERP system acknowledges that the assessment process has begun, but the proposed variation has not yet been approved or rejected, then an assigned assessment variation number is displayed and the assessment status is shown as "submitted" (e.g., Variation 5).

As described in further detail below, the electronic system enables the subcontractor to submit payment requests corresponding to the proposed variation amount before or after the proposed variation is actually approved by the general contractor. If any corresponding amounts have been billed by the subcontractor to date, that billed amount is also displayed to the subcontractor on the Variations Register screen. In the example of FIG. 7, the Variation Register only lists variations corresponding to a single specific subcontract. The subcontractor can use the drop-box in the upper left corner of the interface to select a different subcontract from the same project for display.

Figure 8:
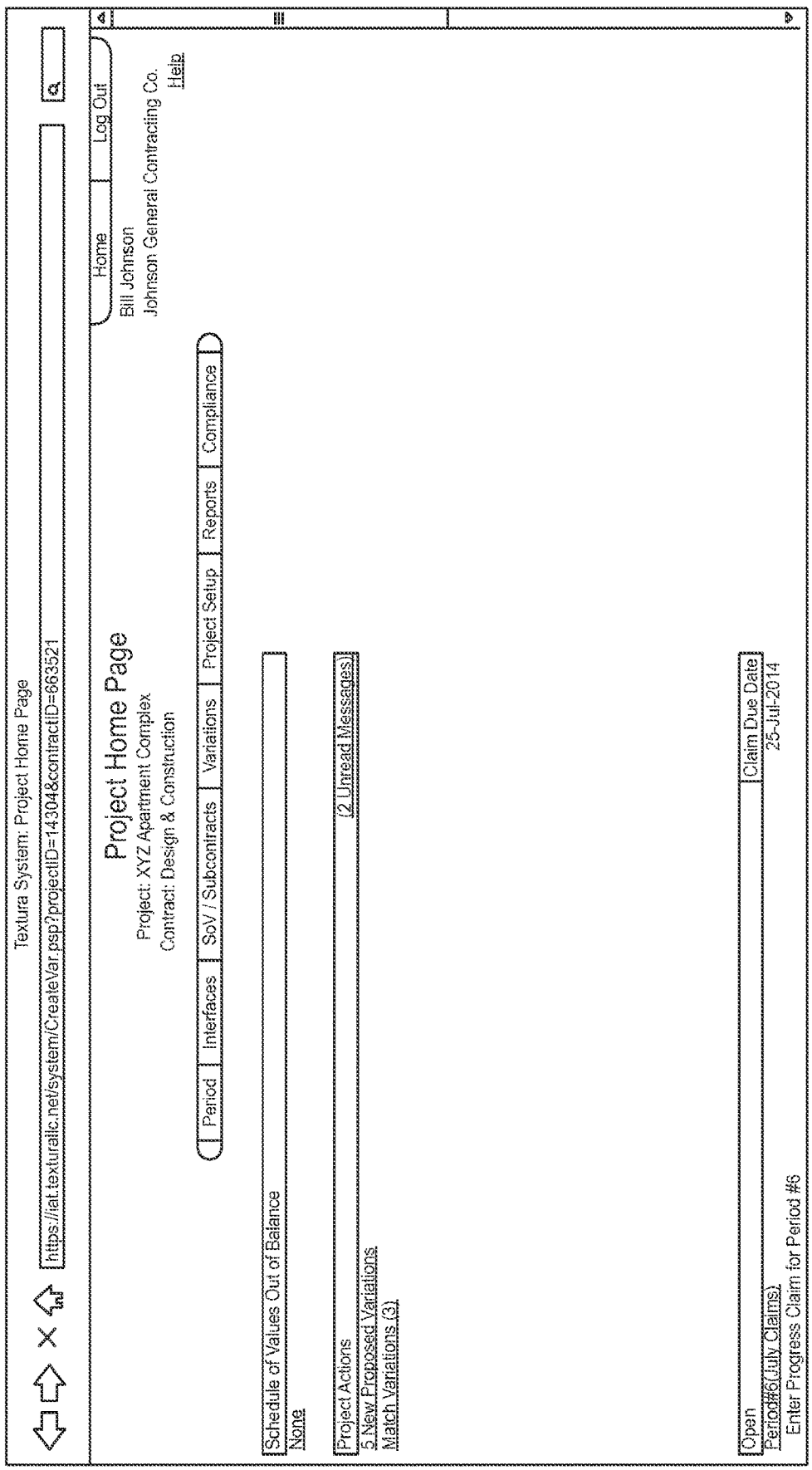
FIG. 8 is a screen-shot of a project home page displayed to a general contractor using the system of FIG. 1.

Once the proposed variation is submitted by the subcontractor, a notification is automatically sent to the general contractor by the CPMS server 101 indicating that a budget variation has been requested (FIG. 4A, step 407). The notification can be sent, for example, in the form of an email identifying the participant that submitted the proposed variation, the proposed variation amount, and the corresponding contract/project. The CPMS server 101 can also notify the general contractor by generating and displaying a message on the general contractor's project home page by implementing a notification/prompting mechanism such the notification/prompting module 125 of FIG. 1B. FIG. 8 illustrates an example of one such project home page including a notification that reads "5 New Proposed Variations" indicating that five new proposed variations are awaiting further action by the general contractor.

At this point, the general contractor can either begin the assessment process (FIG. 4A, step 409) or the subcontractor can begin submitting claims (or requests for payment) against unapproved proposed variations (step 411). The assessment process (step 409) is described further in FIG. 4B and the subcontractor claim process is described in FIG. 4C.

Figure 4B:
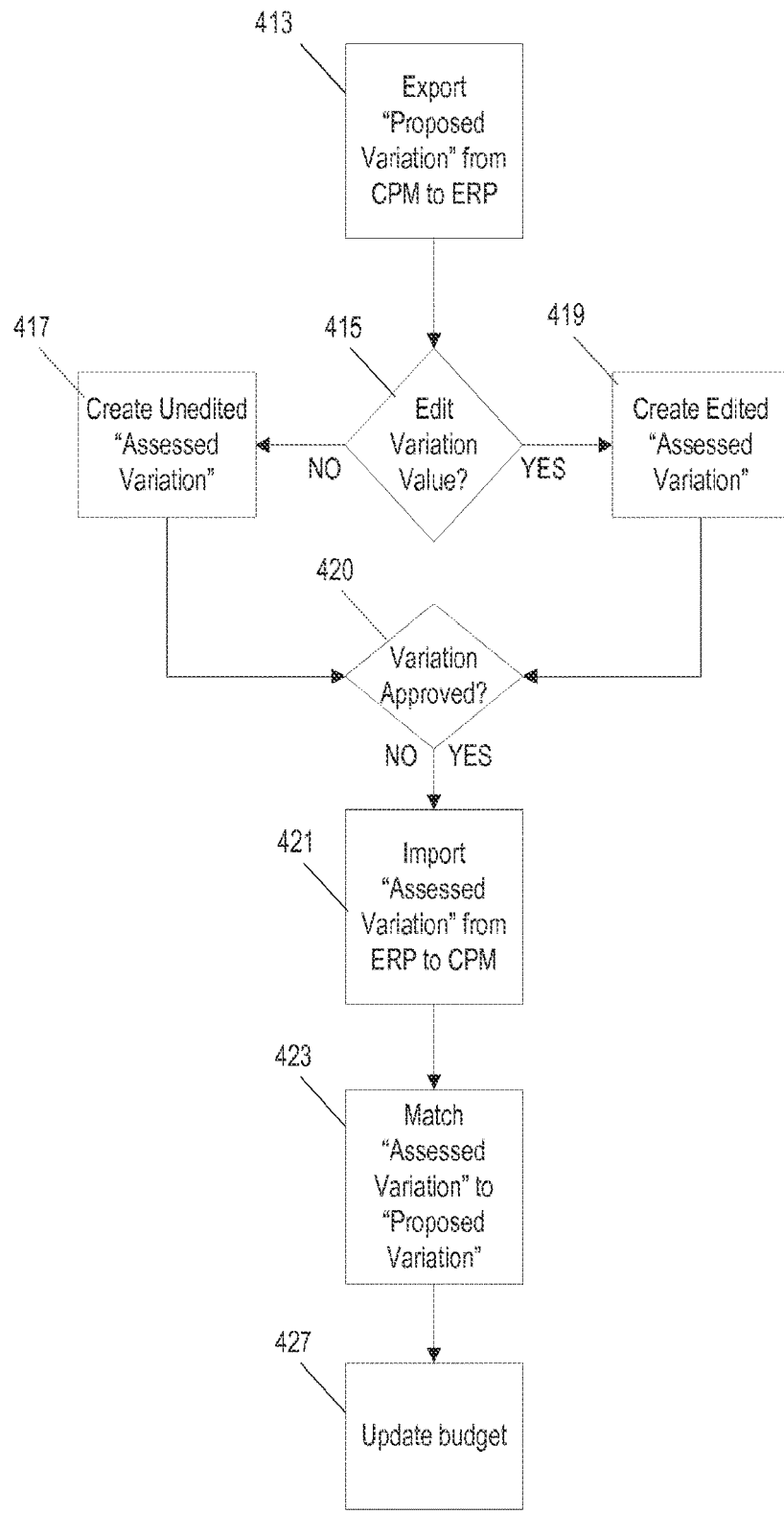
FIG. 4B is a flowchart of a method for reviewing, approving, and processing proposed variations using the system of FIG. 1.

As illustrated in FIG. 4B, the general contractor begins the assessment process by exporting the proposed variations to their external ERP system (step 413). The general contractor decides whether to edit the proposed variation (step 415). If the general contractor does not make any changes to the contract budget values proposed by the subcontractor, then an "assessed variation" is created based on the same values and contract line items defined by the proposed variation (step 417). However, if changes are made, the "assessed variation" is created based on the new values, contract line items, and titles as provided by the general contractor (step 419). The general contractor may edit the proposed variation by changing the value of the new proposed subcontract line item or adding more/fewer subcontract line items than proposed by the subcontractor (as described in further detail below). The general contractor then indicates whether the variation is approved (step 420). If approved, the CPMS server 101 is configured to incorporate the assessed variation as part of the approved subcontract budget. If not, the assessed variation will remain in an "unapproved" state as discussed further below. Furthermore, in this example, a proposed variation may be rejected by approving an assessed variation with a value of $0.00.

The assessed variation (approved or unapproved) generated by the ERP system is then imported into the CPMS (step 421) and are available to be matched to a corresponding proposed variation (step 423). This matching process can be performed through the CPMS interface as illustrated in FIG. 9. FIG. 9 shows an example of a web-based user interface displayed to the general contractor on a user terminal. The user interface shows the details of an unmatched assessed variation that has been imported from the ERP system in the table near the top of the screen (i.e., Var # SV03) and indicates that the assessed variation has been approved (under the "status" column). The interface also lists the details of all pending, unmatched proposed variations in the lower table. Using this interface, the general contractor selects the appropriate unmatched proposed variation from the lower table and presses the "match" button on the screen.

Once the match is complete, the contract budget is updated (step 427) by adding a new subcontract line item to the appropriate subcontract if the assessed variation is "approved." If the assessed variation is not approved and the match is performed, any details or identification information from the general contractors ERP system still become associated with the matched proposed variation; however, no "assessed value" is imported or displayed to the subcontractor. The system may be configured to enable the general contractor to perform the match without approving the proposed variation in order to acknowledge receipt of the proposed variation, to update the general contractor's ERP system, and to allow the subcontractor to continue working while the general contractor negotiates a corresponding adjustment to the general contract with the project owner.

In the example of FIG. 9, a single assessed variation may be matched with one or more proposed variations by checking one or more of the boxes to the left of each listed proposed variation. In some implementations of the system, a single change order may be issued by the general contractor's ERP system that approves contract variation(s) corresponding to multiple proposed variations that have been submitted by the subcontractor. Conversely, as described in detail below, the general contractor may want to make multiple changes to the subcontract instead of a single variation as proposed by the subcontractor. Therefore, other implementations may support a mechanism by which a single proposed variation is matched by the improved electronic process to multiple assessed variations. Similarly, some implementations may allow for batch matching of several proposed variations to several assessed variations.

In many of the examples described herein, the system is configured to automatically update the subcontract budget based on an approved variation received from the general contractor—even if the value of the general contractor's approved variation is different than the value of the subcontractor's proposed variation. In some implementations, a notification/prompting mechanism implemented by the CPMS (such as the notification/prompting module 125 of FIG. 1B) generates and transmits/displays a notification to the subcontractor when the approved variation has a different value or structure than the proposed variation. The notification/prompting mechanism implemented by the CPMS then prompts the subcontractor to either accept the modified variation or submit a new proposed variation. In this way, the subcontractor retains some input over how the subcontract is modified by the general contractor. Similarly, in some implementations, the amended subcontract must be executed (i.e., electronically or manually signed) by both the subcontractor and the general contractor before the approved variation effectively changes the project budgets. The CPMS system may utilize the signing requirement as a mechanism by which the subcontractor is able to review the general contractor's approved variation and to determine whether to accept the approved variation (i.e., by executing the amended subcontract). In cases where multiple proposed variations are submitted by the same subcontractor, the CPMS system may be configured to group all approved variations corresponding to the proposed variations into a single amended subcontract or supplemental subcontract to be executed by the subcontractor and the general contractor.

The general contractor also has access to a Variation Register screen through the CPMS interface. FIG. 10 illustrates an example of one such Variation Register. Like the sub-contractor's Variations Register screen of FIG. 7, the GC's Variation Register displays each proposed variation submitted by a subcontractor and any other variations generated by the general contractor that do not correspond to any subcontractor proposed variation. For variations that were initially proposed by the subcontractor, the Variation Register of FIG. 10 shows the variation amount proposed by the subcontractor (in the "submitted amount" column) and, when applicable, the amount from the corresponding approved variation from the general contractor (in the "approved amount" column). The "Status" column indicates whether the proposed variation has been approved, has been rejected, or is still awaiting an approval decision from the general contractor. Proposed variations that have been rejected by the general contractor have a value of $0 in the "Approved Amount" column. Proposed variations that have been approved for an amount that is different than proposed by the subcontractor are designated as "approved" in the "status" column, but reflect the actual approved variation amount in the "approved amount" column. As discussed above in reference to FIG. 7, proposed variations that have been matched to an "assessed variation" from the general contractor's ERP system will show a status of "submitted" and will show the general contractor's assigned "variation #" (e.g., Variation 5). However, proposed variations that have not yet been matched to an "assessed variation" will show a status of "submitted' without any assessment variation number and without any "approved amount" (e.g., Variation 7). The general contractor can also include "private comments" that are not displayed to the subcontractor, but can be used by the general contractor to record various other information include, for example, reasons why a proposed variation was rejected or edited or why a proposed variation has not yet been approved.

It is to be noted that the systems and methods described in reference to FIG. 4B only provide one specific example. For example, in other implementations of the CPMS, the general contractor may be able to review, edit, and approve variations directly through the CPMS interface. In such systems, the proposed variation would not necessarily be exported to any ERP system, nor would an assessed variation be imported back to the CPMS. Furthermore, in some implementations, the CPMS is configured to automatically match a proposed variation with an assessed variation by using a common identifier or by predicting the most likely match based on the details of a received assessed variation and any remaining, unmatched proposed variations. In some such systems, the CPMS may be configured to ask the general contractor to confirm the automatically identified match.

Systems that are configured to automatically identify matching proposed variations and assessed variations may also be configured to automatically determine when an approved variation received from the ERP system has no corresponding proposed variation initiated by the subcontractor on the CPMS. In such situations, the system would be configured to treat the incoming approved variation is a budget variation initiated by the general contractor and would update the subcontractor budget and subcontract value accordingly (e.g., "GC Variation 2" in FIG. 10).

Figure 4C:
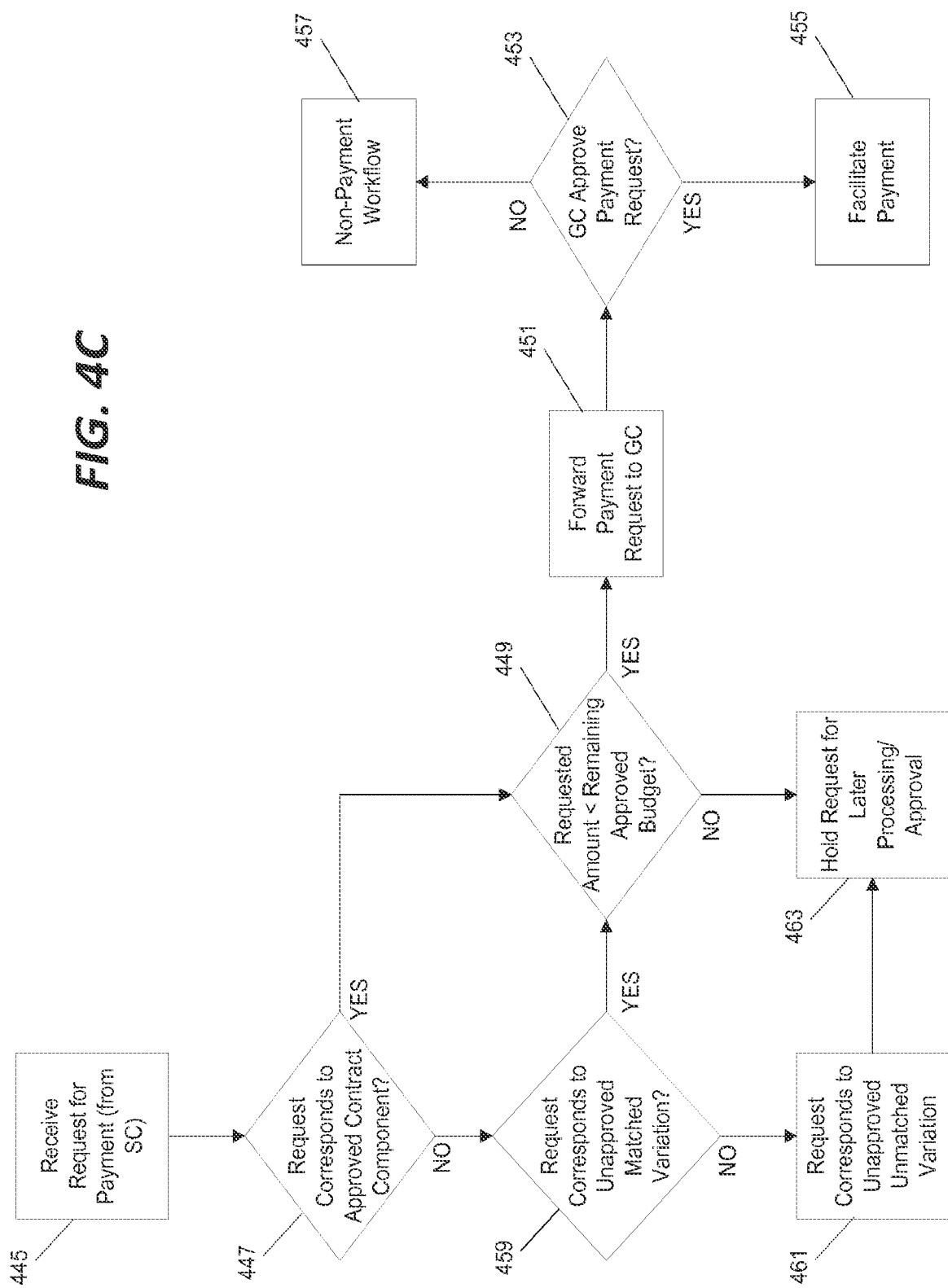
FIG. 4C is a flowchart of a method for requesting and processing payments based on proposed variations using the system of FIG. 1.

FIG. 4C illustrates the claim submission process for a subcontractor using the enhanced variations processing functionality. The subcontractor enters a request for payment into the CPMS (step 445). FIG. 11 illustrates one example of a web-based user interface that can be used to enter payment request details. The user interface of FIG. 11 lists all approved budget line items and unapproved proposed variations submitted by the subcontractor (but still pending approval by the general contractor). The subcontractor uses this interface to identify budget line items for which to submit a claim and enters a new payment amount to be requested during this payment period (e.g., by editing the field in the "this period" column).

The interface of FIG. 11 only allows the subcontractor to request payments that specifically reference either an approved subcontract line item or a proposed variation. The functionality of the request payment interface is only accessible if the subcontractor's budget is properly reconciled. However, unlike in the example of FIG. 2, the subcontractor can create SOVs corresponding to unapproved proposed variations and request payments against the proposed variations (in some implementations, the subcontractor SOV will be created as only a single line item for a proposed variation and cannot be expanded to multiple line items until after the variation is approved). Furthermore, if the requested payment corresponds to a line item of the established subcontract budget (step 447), then the interface of FIG. 11 only allows the subcontractor to request payments for an amount less than or equal to the remaining approved budget for the subcontract line item (step 449). Requests for payment are then forwarded to the general contractor (step 451). If the general contractor approves the payment request (step 453), the CPMS server initiates a workflow to facilitate payment (step 455). Conversely, if the request is rejected, a non-payment workflow is initiated (step 457).

Using the interface of FIG. 11, the subcontractor can also request a payment against an unapproved proposed variation. If the proposed variation has been matched by the general contractor to an "assessed variation" (step 459)—thereby confirming that the proposed variation has been acknowledged by the general contractor's ERP system—then the CPMS can even allow the general contractor to pay against unapproved proposed variations. However, because the subcontract has not yet been modified, the CPMS first determines whether the requested payment amount is less than the remaining balance of the approved subcontract line items (step 449). If so, the request for payment is forwarded to the general contractor (step 451) for review and approval (step 453). If not, then the request for payment is recorded and a holding mechanism implemented by the CPMS (e.g., the holding module 129 of FIG. 1B) may hold the request for payment for later processing and approval (step 463) (i.e., until after the proposed variation has been approved and the underlying subcontract has been modified accordingly). In other implementations that require requests for payment to be submitted and paid on a "draw" schedule, if the requested payment amount exceeds the remaining balance of the approved subcontract line items, the request for payment will be rejected and the subcontractor will be required to resubmit the request for payment during the next draw period.

This "pay on account" mechanism allows payments to be approved as long as the requested payment amount does not exceed the remaining value of the approved subcontract (or total remaining value of all subcontracts for the project assigned to the subcontractor). For example, if a subcontractor proposes a budget variation for an additional $1000 in the subcontract and then requests payment for the full $1000 of the proposed variation, the system would allow the general contractor to approve the payment if the unpaid balance of the subcontract is equal to or exceeds $1000. In this way, if payment is made and the proposed variation is ultimately rejected, it becomes the responsibility of the subcontractor to adjust their SOVs for the subcontract to account for the paid amount.

The CPMS also allows the subcontractor to request payments against proposed variations that have not yet been matched to an assessed variation (step 461). However, because the general contractor has not confirmed that the proposed variation has been acknowledged by their ERP system (i.e., by performing a match to an imported assessed variation), the CPMS holds all such payment requests (step 463) at least until the proposed variation has been matched. In some implementations, the notification/prompting mechanism implemented by the CPMS (e.g., the notification/prompting module 125 of FIG. 1B) instructs the general contractor to assess the proposed variation and to perform a match when a payment has been requested against an unmatched proposed variation.

FIG. 12 illustrates an example of a web-based interface used by the general contractor to review all pending payment claims (i.e., step 453 of FIG. 4C). Among other information, this interface displays the total contracted value for each subcontractor organization, the payment amount requested, the remaining approved contract balance, and the total amount of any payment requests made against unapproved variations (in the "Unapproved Claims" column). The general contractor can view any unapproved variations for a contractor by clicking on the field within the "unapproved claims" column. The "status" column indicates whether a payment request has been received for each subcontractor organization for the current draw period.

Figure 13:
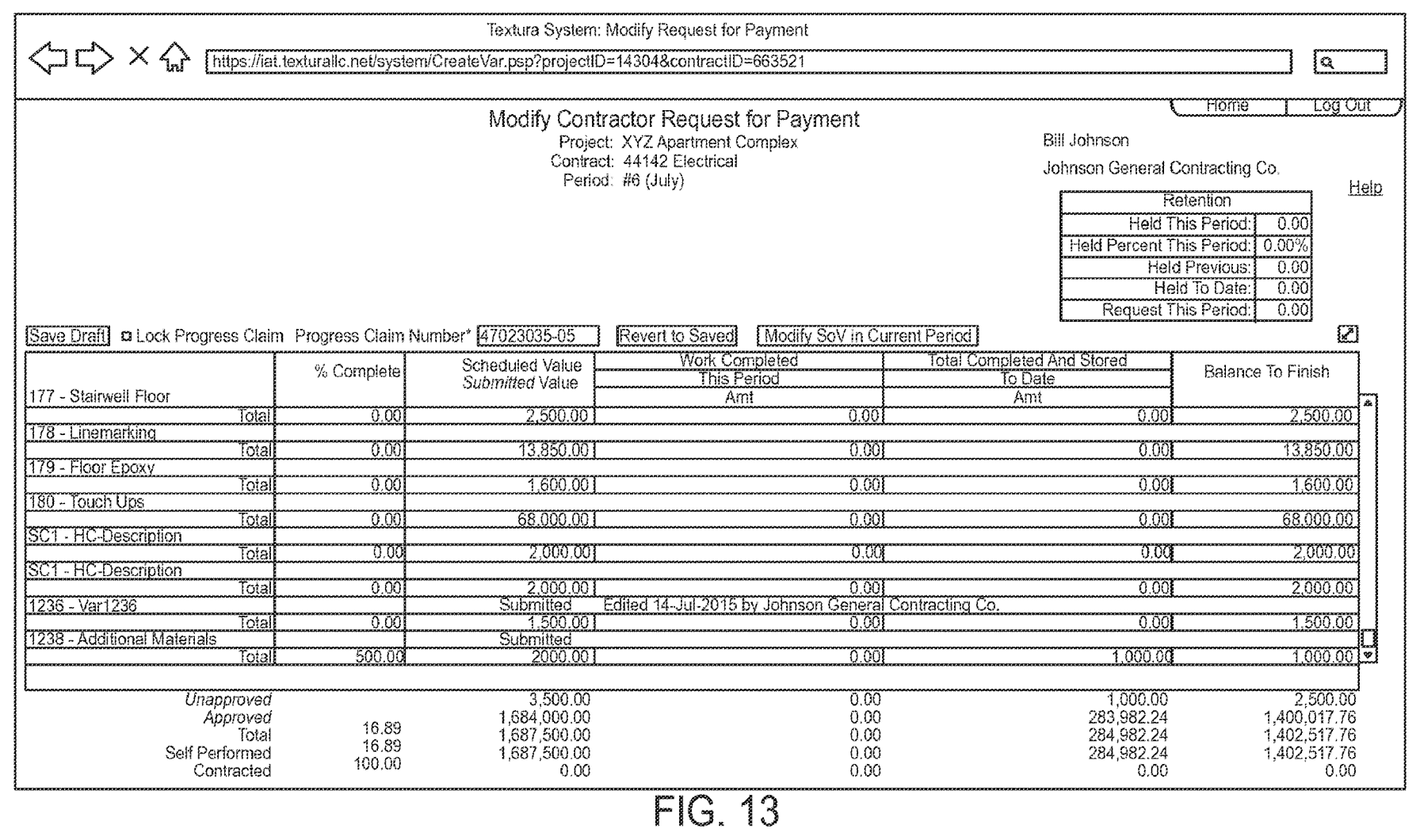

In addition to approving and rejecting a payment request, the general contractor may be allowed to modify a request for payment submitted by the subcontractor prior to payment using the web-based interface of FIG. 13. The "modify" page displayed to the general contractor is similar in content and functionality to the subcontractor claim page displayed to the subcontractor (FIG. 11). However, in addition to changing the amount to be paid for the current payment period, the general contractor can also provide a comment explaining for the subcontractor why the payment amount was edited.

In the systems and examples described above, the subcontractor may be able to propose budget variations at any time (or according to a set schedule). However, payment requests may be solicited, approved, and processed for payment according a more rigidly defined payment schedule such as described, for example, in U.S. Pat. No. 7,899,739, the entire contents of which are incorporated herein by reference.

Figure 14:
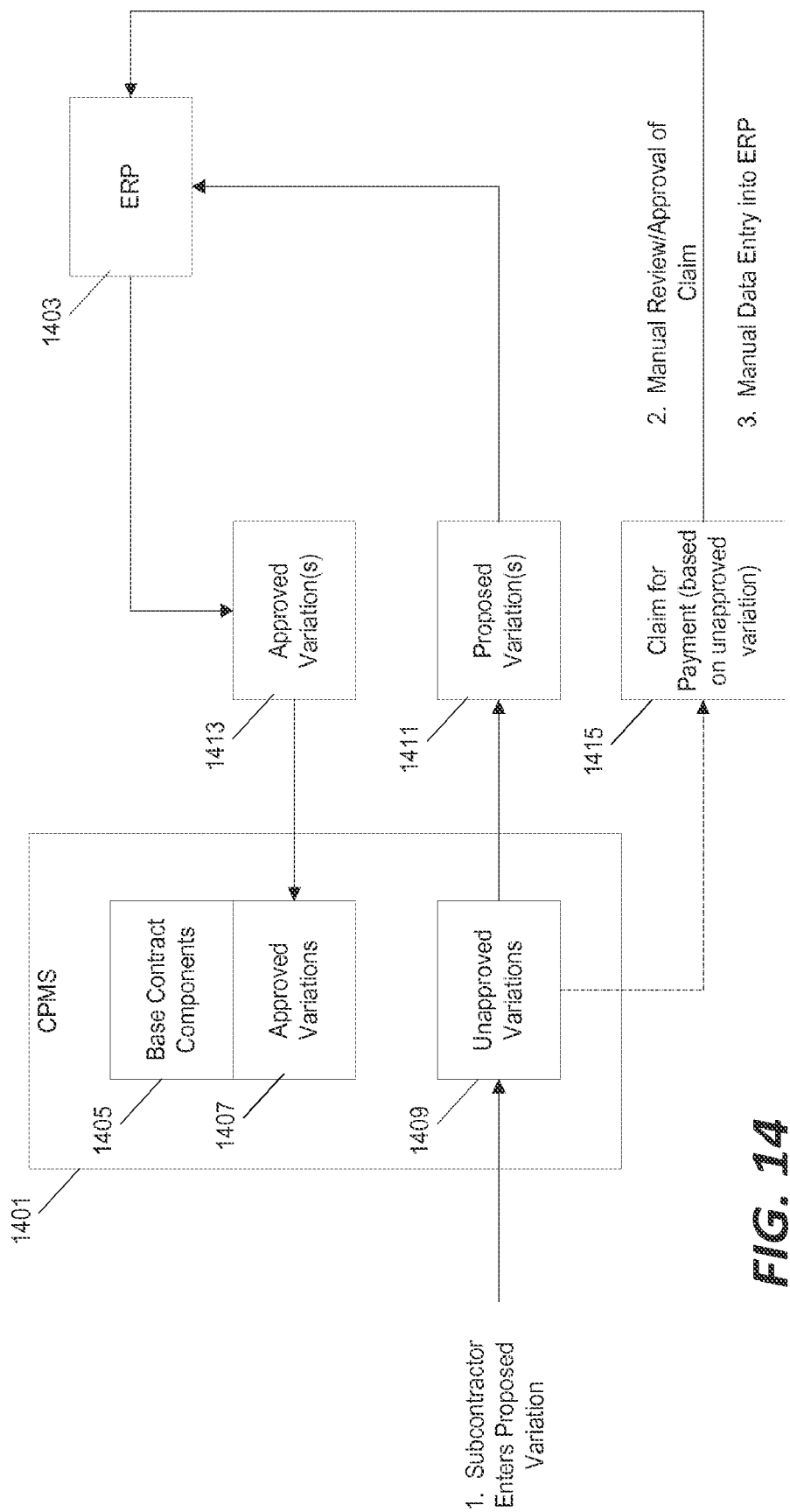
FIG. 14 is a block diagram of data storage and process flow for receiving and processing budget variations and payment claims against unapproved proposed variations using the method of FIGS. 2 and 3.

The functional differences between standard variations processing (of FIGS. 2-3) and enhanced variations management (FIGS. 4A-4C) are discussed above from the perspective of a system user. However, these differences are integrally related to differences in how the CPMS server implements and tracks budgets on a hardware/data structure level. FIG. 14 illustrates the data structure and process flow interactions between the CPMS server 101 and the ERP system 117 during standard change order processing. The CPMS 1401 stores the components of the base contract 1405 including any previously approved variations 1407. Unapproved proposed variations 1409 are stored and tracked separately by the CPMS 1401. When a subcontractor enters a proposed variation into the system, a variation request 1411 is generated and transmitted to the external ERP system 1403. If the request 1411 is approved, the general contractor (through their ERP system) must update the contract value adding the new approved variation 1413 to the list of approved variations 1407 stored on the CPMS 1401 as a part of the project budget/contract.

Although the subcontractor is able to generate variation requests 1411 by entering proposed variations 1409 through the CPMS 1401 in the example of FIG. 14, the actual variation 1413 must come directly from the general contractor. As such, no real data is maintained that the system can use to link a requested payment to both the change order request 1411 generated by the user and the approved variation 1413 received from the general contractor. In order for a subcontractor to request a payment against an unapproved proposed variation 1409, the subcontractor may have to generate an invoice 1415 outside of the CPMS 1401 and forward it to the general contractor for manual review and approval. Even if the CPMS 1401 were configured to allow the subcontractor to generate a request for payment against an unapproved proposed variation 1409, the claim 1415 must be manually reviewed by the general contractor and the data entered manually into the ERP 1403.

Figure 15:
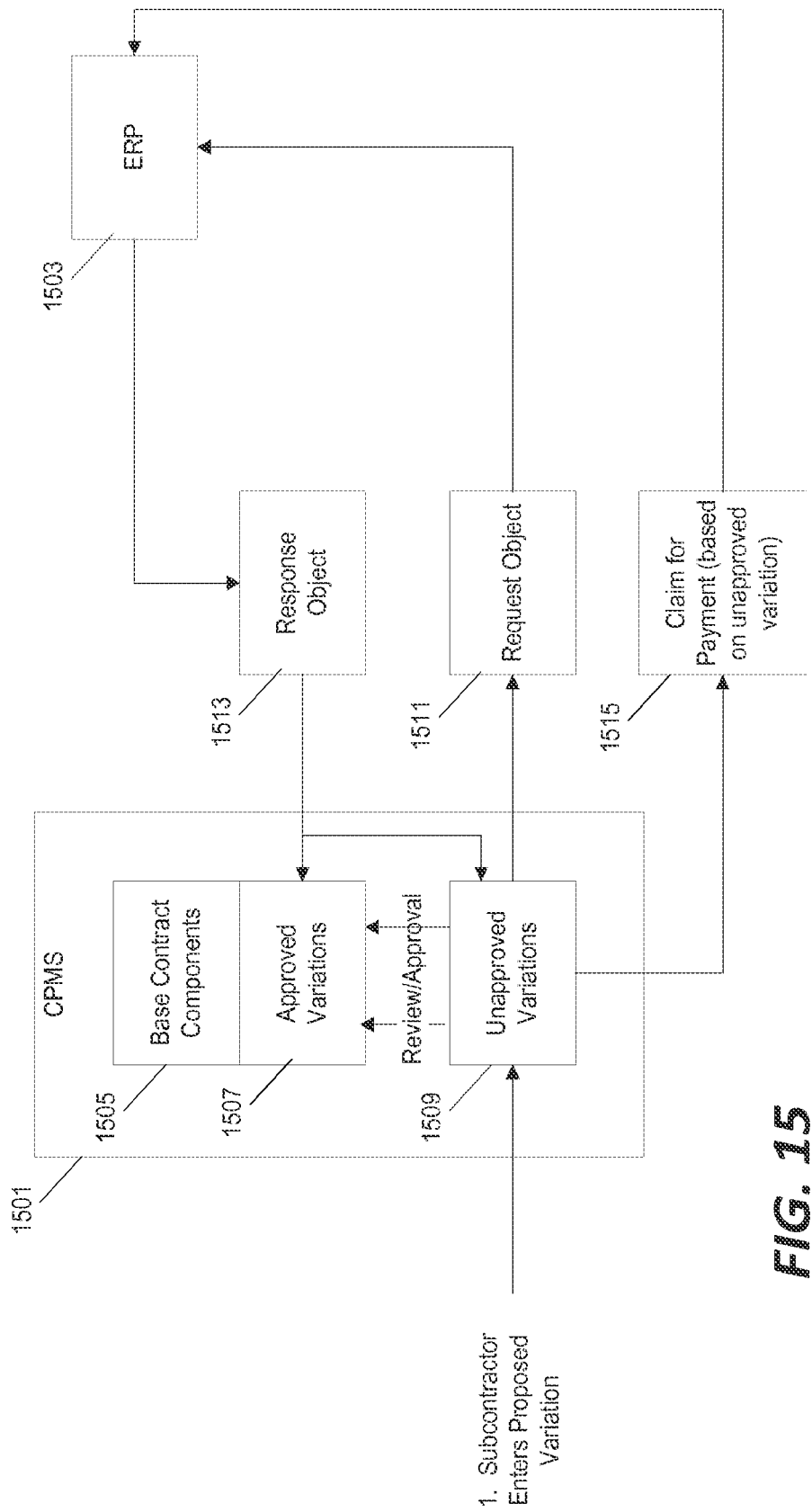
FIG. 15 is a block diagram of data storage and process flow for receiving and processing budget variations and payment claims against unapproved proposed variations using the method of FIGS. 4A, 4B, and 4C.

In contrast, FIG. 15 illustrates the data flow and interaction process between the CPMS 1501 and the ERP 1503 during enhanced variation management. The CPMS 1501 stores the base contract components 1505 including any approved variations 1507. The CPMS 1501 also ties the requested/unapproved variations 1509 to the base contract components 1505 such that, when approved, the proposed variation data becomes directly linked to the approved contract budget. As a proposed variation is created and submitted by the subcontractor (FIG. 4A, steps 401, 403), the system generates a request object 1511 that is stored on the CPMS. When the proposed variation is exported to the ERP system (FIG. 4B, step 413), a copy of the request object 1511 is transmitted to the ERP system 1503. After the general contractor has completed his review of the proposed variation, a response object 1513 satisfying certain formatting and content criteria (as described in detail below) is imported to the CPMS 1501 from the ERP 1503 (FIG. 4B, step 421). After the assessed variation is matched with a proposed variation (FIG. 4B, step 423), the response object 1513 is updated to target the corresponding request object 1511. Although the value(s) and line item structure of the response object 1513 supersedes the value(s) and line item structure of the request object 1511 (as discussed in further detail below), when the response object 1513 approves the variation, the request object 1511 passes through from the unapproved variations 1509 and becomes directly tied to the approved budget as an approved variation 1507. If the response object 1513 does not contain an approved variation, the request object 1511 remains associated with the unapproved variations 1509 until a subsequent response object 1513 is received from the ERP 1503 that does contain an approved variation.

In this way, the CPMS 1501 can allow the user to take actions that targets an unapproved request object data structure—such as, for example, submitting a claim for payment 1515. When the request object 1511 is matched with a response object 1515 and becomes part of the approved variations 1507, the association between the payment request 1515 and the request object 1511 then becomes an association with an approved variation 1507. Payment claims do not need to be manually reviewed or data entered into the ERP system manually. Instead, the CPMS 1501 is configured to maintain the data structure objects throughout the process of proposing and approving budget variations while provide interactions between the CPMS and an external ERP system. Furthermore, once the response object is linked with a matched request object, any actions taken by the subcontractor in the CPMS that target the request object are similarly indexed and recognized by the general contractor's ERP system as corresponding to the response object generated by and sent from the ERP system. Therefore, data and functionality are seamlessly integrated between the CPMS system and the external ERP system even if actions are taken by the subcontractor on the CPMS system before an approved variation is created on the ERP system.

In the examples discussed below, this data matching and integration process is dictated and controlled by a unique data structure life cycle as illustrated in FIG. 16A. When a new data structure object (either a request object or a response object) enters the system, it is assigned an initial status—request objects created on the CPMS initially have an "unsubmitted" status 1601 and response objects imported into the CPMS initially have an "unmatched" status 1602. When the data structure object is ready to be acted upon by the CPMS (i.e., after the proposed variation corresponding to the request object is submitted and after the assessed variation corresponding to the response object is "matched"), the object is assigned a "staged" status 1603. Once the CPMS has acted on the data structure object and it has reached its final end-state, its status is changed to an "end-state" status of either "promoted" 1605 or "merged" 1607.

For example, when a new proposed variation is created by the subcontractor (FIG. 4A, step 401), a request object data structure is created and assigned an initial status of "unsubmitted" 1601. While the request object has an "unsubmitted" status 1601, the subcontractor can edit the data of the proposed variation and the CPMS will not begin processing the request object. When the user submits the proposed variation for consideration by the general contractor, the request object is assigned the status of "staged" 1603 indicating that the CPMS may begin processing the request object. Once the CPMS has processed the request object updating the target fields to refer to future locations of potential new subcontract line items in the subcontract budget data structure (as described in further detail below) and the request object is exported to the ERP system, the request object stored on the CPMS is assigned a status of "promoted" 1605.

Figure 16B:
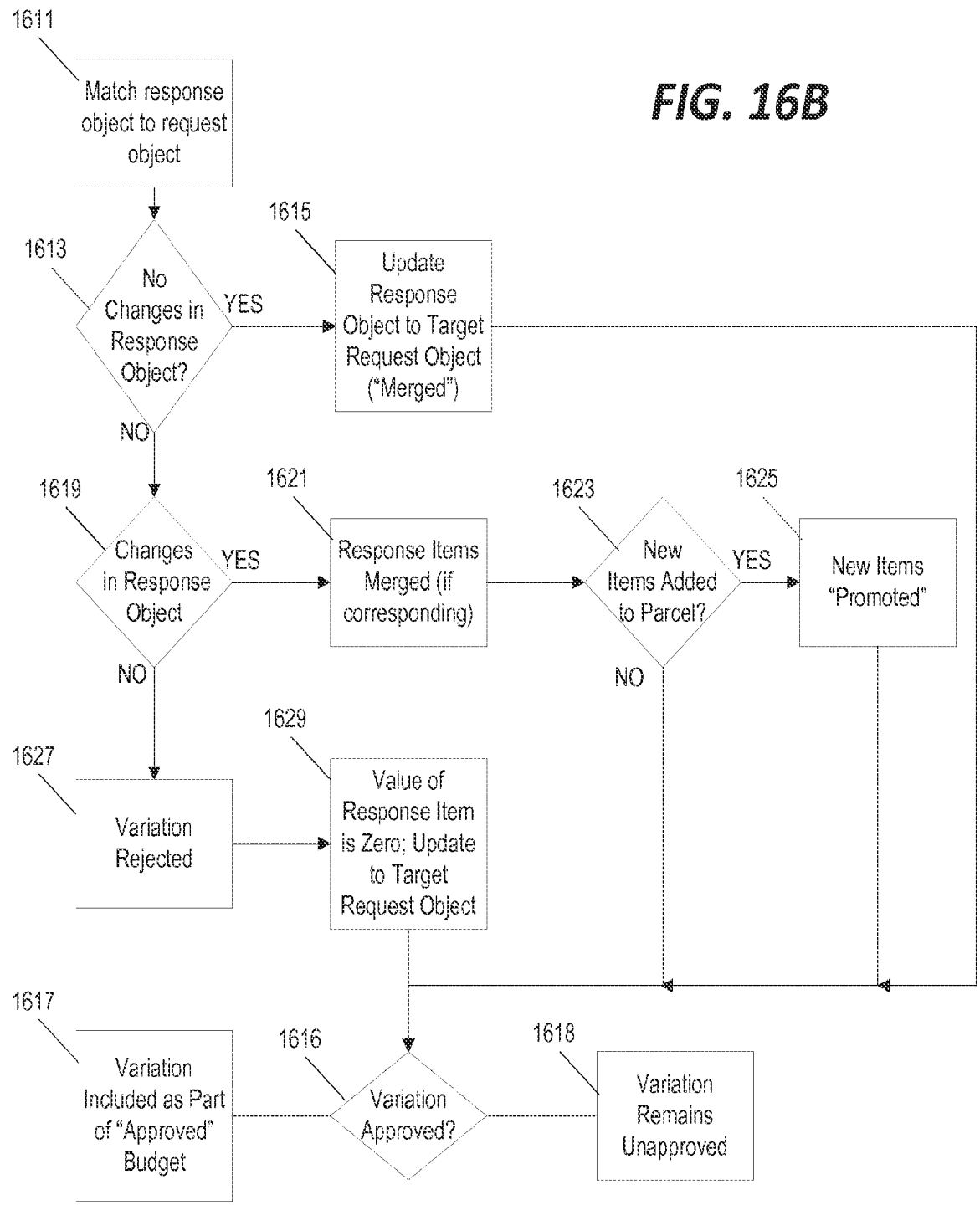
FIG. 16B is a flowchart of a method for merging a response object data structure received from an external ERP system with a request object data structure generated by the CPMS.

Similarly, in implementations that require the general contractor to manually match an assessed variation to a proposed variation, a response object that is received by the CPMS from the ERP (FIG. 4B, step 421) is initially assigned a status of "unmatched" 1602. After the general contractor has matched the assessed variation corresponding to the response object to a proposed variation, the status of the request object is updated to "staged" 1603 indicating that the CPMS may begin processing the response object. However, unlike the request object, the response objects have two potential end-states—"promoted" 1605 and "merged" 1607. After the response object has reached "staged" status 1603, the CPMS performs a merging routine as illustrated in FIG. 16B to link the response object to the request object corresponding to the matched proposed variation. Individual items from the response object that correspond to items of the request object are updated to target the corresponding item of the request object (as described in detail below) and are assigned the "merged" status 1607. Conversely, any items in the response object that do not have a corresponding item in the request object are updated to directly target a location of a new subcontract component in the subcontract budget data structure and are assigned the "promoted" status 1605.

Although "merged" 1607 and "promoted" 1605 are both potential end-states for data structure objects and individual items within the data structure object, they each denote a different targeting process. "Promoted" data objects and items directly target a location for a new subcontract component in a subcontract budget data structure. "Merged" data objects and items indirectly target the subcontract budget data structure by targeting another data structure object (i.e., the response object targeting the request object, which in turn targets the subcontract budget data structure).

FIG. 16B illustrates the merge routine in further detail. After the general contractor has matched an assessed variation with a proposed variation (thereby identifying a request object corresponding to the response object) (step 1611 (i.e., FIG. 4B, step 423)), the CPMS determines whether the assessed variation was returned without any edits (step 1613). If so, the response object will include the same number of items and the same values as the matched request object. The CPMS then updates the response object so that it targets the matched data structure and updates the status of the object and all of the items within the object to "merged" (step 1615). If the response object indicates that the variation has been approved (step 1616), then the subcontract budget data structure is updated to include a new subcontract component corresponding to the approved variation (step 1617). If the response object does not include an indication that the variation has been approved, then the proposed variation remains as an unapproved variation and the request object and response object are not yet elevated to become part of the approved subcontract budget (step 1618)

If the proposed variation has been edited (step 1619), then the response object may include additional items that are not present in the matched request object and/or different values for items that do exist in the matched request object. Any response items that have a corresponding item in the request object are updated to target the corresponding item and their status is changed to "merged" (step 1621)—even if the values in the response object are different than the corresponding value in the request object. If new items have been added in the response object (step 1623), those new items are updated to directly target the location of the new subcontract line item in the subcontract budget data structure and are assigned the "promoted" status (step 1625).

In the special case of a rejected variation (step 1627), the response object will have the same items as the matched request object, but the response object will define the value of the variation as zero dollars ($0). The response object is updated to target the request object and the status of the response object is changed to "merged" (step 1629). A new subcontract line item is added to the subcontract budget data structure with a value of $0 (step 1617).

FIG. 17 illustrates the content and format of one example of a request object data structure generated by the CPMS when a new proposed variation is created by the subcontractor (i.e., FIG. 4A, step 401). The request object is in the form of a parcel with a plurality of items. The parcel data structure includes a parcel ID, a parcel type, and a status. The parcel data structure also includes two items: a change order item and a contract component item. Both items have an item ID, a type, a status, a target, and an amount. In FIG. 17, the status of the parcel and both items is "unsubmitted" because the proposed variation request has not yet been "submitted" by the subcontractor (i.e., step 403 in FIG. 4A has not yet occurred).

Once the subcontractor submits the change order request (FIG. 4A, step 403), the status of the parcel and all items is changed to "staged." The CPMS then begins processing the request object by updating the "target" field of each item to refer to a physical memory location of another data structure or object. The status of each item and the parcel itself is then updated to "Promoted," indicating that the request object has reached its end-state. FIG. 18 illustrates an example of a "promoted" request object data structure. The status of the parcel and each item is listed as "promoted" and each item includes a target. The "ContractComp" item targets a location that will be used for the new subcontract line item in the subcontract budget data structure. The change order target refers to a unique memory address or document identification number used to facilitate the relationship between requests and items resulting from a match.

The data structure of FIG. 17 is generated when the subcontractor creates a new draft proposed variation (FIG. 4A, step 401). The status of the data structure is changed as shown in FIG. 18 after the potential variation is submitted (FIG. 4A, step 405). After the general contractor has assessed the proposed variation and imports an assessed variation from the ERP system (FIG. 4B, step 413), a new response object data structure is stored in CMPS memory. FIG. 19 illustrates one example of such a response data structure. Again, the response data structure is a parcel with one or more associated "items." The parcel and items are identified by an ID and assigned a status and a target. Although not illustrated in FIG. 19, the response object received from the ERP system will also include a flag or field indicating whether the variation is approved or unapproved.

A response object received from an ERP system, such as illustrated in the example of FIG. 19, initially has no targets and the status of the parcel and all items is listed as "unmatched." Once the assessed variation is matched to a proposed variation (FIG. 4B, step 414), the parcels are "merged" according to the method of FIG. 16B and the response object data structure is updated with appropriate targets. FIG. 20 illustrates one example of a "merged" response data structure. The "target" of the parcel is updated to reflect the parcel ID of the target request parcel—in this example, parcel 5 (i.e., the request object of FIG. 18).

However, in this example, the response data structure includes more "items" than the matched request data structure. Instead of simply approving the proposed variation submitted by the subcontractor, the general contractor has chosen to create two new subcontract line items and to divide the approved additional budget amount of $1000 between the two new subcontract line items. As such, the response parcel includes two "contract component" items—one with an amount of $900 and the other with an amount of $100. When the response parcel is merged with the request parcel, the first contract component item is merged with the contract component item of the request parcel—the target of the first contract component item in the response parcel is updated to reflect the item ID of the contract component item in the request parcel (in this example, item 11) and the status of the first contract component item is changed to "merged." Because there is no corresponding second contract component item in the corresponding request parcel of FIG. 18, the second contract component item of the response parcel is updated to target a new additional subcontract line item of the subcontract budget data structure and the status of second contract component item is changed to "promoted" (thereby indicating that the second contract component item targets the subcontract budget data structure directly instead of indirectly targeting the subcontract budget data structure through the request object).

FIGS. 21-26 illustrate how the subcontract budget data structure and the general contract budget data structure stored on the memory of the CPMS are updated as the CPMS processes the request object and response object as illustrated in FIGS. 17-20. FIG. 21 shows the original, unaltered general contract budget for the project including three contract line items. The total contract amount for the overall project contract is $4,000,000.00 divided among the three contract line items as indicated by each associated line item amount. The example of FIG. 21 indicates that only one subcontract currently corresponds to each general contract budget line item. FIG. 22 shows the subcontract budget data structure for the subcontractor that has a subcontract corresponding to the "electrical" budget line item from the general contract budget data structure. The total budget amount for the subcontract is $500,000.

When the subcontractor creates and submits a proposed variation (i.e., the request object of FIG. 18), the subcontract budget data structure can be stored and displayed in two ways (or contexts)—an approved subcontract budget (FIG. 22) and a potential subcontract budget (FIG. 23). However, until the proposed variation is reviewed and approved by the general contractor, the general contractor's perspective of the subcontract budget data structure is unaltered and remains as illustrated in FIG. 21. Once the proposed variation is approved by the general contractor, it becomes part of the subcontract budget and is reflected as part of the overall project budget. As illustrated in FIG. 24, the updated general contractor budget includes an increased amount for the electrical line item and an increased total contract amount as dictated by the response object (i.e., the approved variation from the general contractor).

Once the proposed variation is approved by the general contractor, the subcontract budget data structure is also updated to reflect any changes in amount or terminology of the proposed variation as dictated by the response object. FIG. 25 illustrates the updated subcontract budget data structure after the response object of FIG. 20 has been processed by the CPMS. In this example, as discussed above in reference to FIGS. 19-20, rather than approve a single new subcontract line item in the amount of $1000, the general contractor has approved two separate new subcontract line items—"GC CC 1" for $900.00 and "GC CC 2" for $100.00.

As also discussed above, in some implementations, the subcontractor is able to create and submit requests for payment against a proposed variation before that variation has been added to the approved subcontract budget. According to the response object of FIG. 20, the general contractor has approved two new subcontract line items for $900 and $100 instead of a single line item for $1000. However, as shown in FIG. 26, to account for a previous request for payment submitted by the subcontractor against the requested $1000 subcontract line item, the subcontract budget data structure is updated such that the entire proposed variation amount of $1000 is allocated to a single new subcontract line item as proposed by the subcontractor (i.e., the request object). To comply with the structure defined by the general contractor's response object, a second new subcontract line item is added, but initially shows a value of $0. Because this allocation does not coincide directly with the approved variation as dictated by the general contractor's response object, this subcontractor may be required to update and reconcile the subcontract SOV for each new subcontract line item to account for this discrepancy before further payment requests can be generated on behalf of the subcontractor.

FIGS. 27-31 provide another example of an interaction between a general contractor and a subcontractor. In contrast to the example described above in reference to FIGS. 17-26, in this example, the general contractor has simply approved the variation exactly as proposed by the subcontractor. FIG. 27 shows the "unsubmitted" request object requesting a new subcontract line item with a value of $1000. In FIG. 28, the request object has been "promoted" after the proposed variation is submitted by the subcontractor. FIG. 29 shows the "unmatched" response object received from the ERP system. Unlike the example of FIG. 19, the response object of FIG. 29 includes the same number of items and the same contract component value as the matched request object of FIG. 28. In FIG. 30, the response object has been merged with the request object—targets are updated to refer to the corresponding parcel and item IDs and the status of the parcel and all items in the response object are changed to "merged." Because the request object of FIG. 28 includes a corresponding item for each item in the response object of FIG. 30, no items in the response object are made to directly target the subcontract budget data structure or have their status changed to "promoted." As shown in FIG. 31, when the variation is approved exactly as requested, the actual subcontract budget data structure is ultimately updated to match exactly the proposed subcontract budget data structure (i.e., FIG. 23).

FIGS. 32-36 illustrate yet another example. In this scenario, the general contractor has rejected the variation requested by the subcontractor. The "unsubmitted" and "promoted" request objects of FIGS. 32 and 33, respectively, are the same as in the prior examples. However, in the "unmatched" and "promoted" response objects of FIGS. 34 and 35, respectively, the value of the new contract component is set to $0 instead of $1000. As a result, after the match and merge are completed, the subcontract budget data structure is updated to include a new subcontract line item as proposed by the subcontractor, but the value of that new line item is set at $0 as dictated by the response object.

The specific examples and scenarios discussed above are intended to be exemplary and are not exclusive. For example, the mechanisms described above may be used to regulate the creation of invoices in the United States, progress claims in Australia, or other payment request mechanisms relevant to other jurisdictions. As such, budgetary and payment terminology used above is intended to apply equally to other various terms used in other jurisdiction.

Although the example data structures discussed above include textual components—for example, text "status" indicators, it will be understood that these status identifiers may be implemented numerically. For example, the initial state statuses of "unsubmitted" or "unmatched" may be assigned a first status identifier value of "1" while the "staged" status is represented by a second status identifier value of "2" and the end states of "merged" and "promoted"

are represented by a third and fourth status identifier value of 3 and 4, respectively. Furthermore, as discussed above, the examples herein primarily discuss interactions between a general contractor and a subcontractor. However, the systems and methods can be equally applied to other participants including, for example, an architect, bank, property owner, general contractor, head contractor, subcontractor, materials supplier, etc.

Thus, the invention provides, among other things, a system for processing budget variations and tracking and facilitating payments according to such proposed budget variations by using linked data structures. Various features and advantages of the invention are set forth in the following claims.

What is claimed is:

1. A computer-implemented method of processing a variation of a construction project contract, the construction project contract being between a contractor and a second party for work to be performed on a construction project by the contractor for the second party, the method comprising:
generating, by a computer-based system, a request object data structure in response to receiving a proposed variation of the construction project contract, the proposed variation being initiated by the contractor, the request object data structure including at least one new contract component item, the at least one new contract component item of the request object data structure including a first new contract component item that includes an item ID field identifying an item ID of the first new contract line item, a target field identifying a memory location for a new contract line item in a contract budget data structure, and a proposed value field identifying a proposed value for the new contract line item;
storing the request object data structure on a non-transitory computer-readable memory of the computer-based system;
transmitting a copy of the request object data structure to an external system associated with the second party;
receiving, by the computer-based system from the external system associated with the second party, a response object data structure indicative of an approved variation of the construction project contract, the response object data structure including at least one new contract component item, the at least one new contract component item of the response object data structure including a first new contract component item that includes a target field and an approved value field identifying an approved value for the new contract line item;
automatically determining matching data structures where the request object data structure corresponds to the response object data structure by identifying at least a similar identifier included in both the proposed variation of the request object data structure and the approved variation of the response object data structure;
in response to automatically determining the matching data structures, receiving a match instruction, by the computer-based system, the match instruction identifying the request object data structure and the response object data structure as both corresponding to the proposed variation initiated by the contractor;
automatically linking the request object data structure that contains the proposed variation to the response object data structure containing the approved variation to cause subsequent actions taken on the request object data structure including:
(i) identifying one or more actions that target the request object data structure and indexing the one or more actions to correspond to the response object data structure; and
(ii) recognizing the one or more actions as corresponding to the response object data structure based at least in part on the indexing;
automatically updating the target field of the first new contract component item of the response object data structure to include the item ID of the first new contract component item of the corresponding request object data structure in response to receiving the match instruction; and
updating the contract budget data structure to include the new contract line item at the memory location identified by the target field of the first new contract component item of the request object data structure, the new contract line item including a cost value defined based on the approved value of the first new contract component item from the response object data structure.

2. The method of claim 1, wherein generating the request object data structure includes generating a request object data structure that includes a status field indicating a status condition of the request object and assigning a first status condition to the request object data structure when the request object is generated, the method further comprising:
receiving a submit instruction for the request object from the contractor;
updating the status field to assign a second status condition to the request object in response to receiving the submit instruction; and
updating the target field for the first new contract component item of the request object data structure to identify the memory location for the new contract line item in the contract budget data structure only when the status field of the request object data structure indicates that the status condition of the request object data structure is the second status condition.

3. The method of claim 2, further comprising:
allowing the contractor to edit details of the request object data structure when the status field of the request object data structure indicates that the status condition of the request object data structure is the first status condition; and
preventing the contractor from editing the details of the request object data structure when the status field of the request object data structure indicates that the status condition of the request object data structure is not the first status condition.

4. The method of claim 1, further comprising initiating, by the computer-based system, a request for a payment to the contractor, wherein the request for the payment is received before receiving the response object data structure, and wherein the request for the payment identifies the first new contract component item of the request object data structure by the item ID.

5. The method of claim 4, further comprising processing an approval of the request for the payment only after receiving the response object data structure and only if a requested payment amount of the request for the payment is not greater than the approved value for the new contract line item defined by the response object data structure.

6. The method of claim 1, further comprising:
receiving, by the computer-based system from the external system associated with the second party, a second response object data structure indicative of an unapproved variation of the construction project contract, the second response object data structure begin received before the response object data structure indicative of the approved variation; and receiving, by the computer-based system, a second match instruction, the second match instruction identifying the request object data structure and the second response object data structure as both corresponding to the proposed variation initiated by the contractor.

7. The method of claim 6, further comprising:

initiating, by the computer-based system, a request for a payment to the contractor corresponding to the proposed variation; and processing an approval of the request for the payment after receiving the second match instruction and before receiving the response object indicative of the approved variation.

8. The method of claim 1, wherein receiving the response object data structure includes receiving a response object data structure including at least one more new contract component item than the corresponding request object data structure, the at least one more new contract component item of the response object data structure including a second new contract component item, the second new contract component item including a target field and an approved value for a second new contract line item, the method further comprising:

automatically updating the target field of the second new contract component item of the response object data structure to identify a memory location for the second new contract line item in the contract budget data structure; and updating the contract budget data structure to include the second new contract line item at the memory location identified by the target field of the second new contract component item of the request object, the second new contract line item including a cost value defined based on the approved value of the second new contract component item of the response object data structure.

9. The method of claim 8, further comprising:

updating a status field of each new contract component item of the at least one new contract component items of the response object to indicate a first status condition when the target field identifies an item ID associated with the request object and to indicate a second status condition when the target field identifies a memory location for a new contract line item in the contract budget data structure.

10. The method of claim 1, wherein the second participant includes a general contractor for the construction project and the contractor includes a subcontractor, the method further comprising:

storing, on the non-transitory computer-readable memory of the computer-based system, a general contractor budget for the construction project including a plurality of general contractor budget line items and a cost value for each general contractor budget line item;

storing, on the non-transitory computer-readable memory of the computer-based system, the contract budget data structure, the contract budget data structure being linked to a first general contractor budget line item of the plurality of the general contractor budget line items and including a plurality of contract line items and a cost value for each contract line item; and updating the cost value of the first general contractor budget line item in response to updating the contract budget data structure to include the new contract line item.

11. The method of claim 1, further comprising displaying to the second party on a user interface a list of all pending proposed variations, and wherein receiving a match instruction includes receiving a selection of a pending proposed variation corresponding to the request object data structure from the list of all pending proposed variations.

12. The method of claim 1, wherein receiving the response object data structure includes receiving a response object data structure that includes a field identifying the request object data structure, and wherein receiving the match instruction includes pairing the request object and the response object based on the field of the response object data structure identifying the request object data structure.

13. The method of claim 1, further comprising:

receiving, by the computer-based system from the external system associated with the second party, a second response object indicative of a second approved variation of the construction project contract, the second response object data structure including at least one new contract component item, the at least one new contract component item of the second response object data structure including a third new contract component item that includes a target field and an approved value field identifying an approved value for a third new contract line item;

receiving an instruction confirming that the second response object data structure will not be matched to any request object;

automatically updating the target field of the third new contract component item of the second response object data structure to identify a memory location for the third new contract line item in a contract budget data structure in response to receiving the instruction; and updating the contract budget data structure to include the third new contract line item at the memory location identified by the target field of the third new contract line item of the second response object, the third new contract line item including a cost value defined based on the approved value of the third new contract component item from the second response object data structure.

14. The method of claim 13, wherein receiving the instruction confirming that the second response object data structure will not be matched to any request object includes receiving a user input from the second party through a user interface.

15. The method of claim 13, wherein receiving the instruction confirming that the second response object data structure will not be matched to any request object includes automatically identifying an indicator in the second response object data structure indicating that the second response object data structure does not correspond to any request object.

16. The method of claim 1, wherein receiving the response object data structure includes receiving a response object data structure where the approved value for the new contract line item identified by the approved value field of the first new contract component item of the response object data structure is different than the proposed value for the new contract line item identified by the proposed value field of the first new contract component item of the request object data structure.

17. A computer-implemented method of processing budget variations on a computer-based budget management system, the method comprising:

storing on a non-transitory computer-readable memory a contract budget data structure, the contract budget data structure including a total contract budget amount, a plurality of contract budget line item objects, and a line item value for each contract budget line item object of the plurality of contract budget line item objects;

receiving, by the budget management system from a first user, a first request for payment for work performed by the first user on a project, the first request for payment referencing at least one contract budget line item object;

receiving, by the budget management system from the first user, a request for a new variation to the total contract budget amount of the contract budget data structure;

generating a proposed budget variation data structure in response to receiving the request for the new variation, the proposed budget variation data structure including a contract component item, the contract component item including an item ID and a value of a proposed new contract budget line item object to be added to the contract budget data structure;

automatically determining matching data structures where the contract budget data structure corresponds to the proposed budget variation data structure by identifying at least a similar identifier included in both the contract budget data structure containing the total contract budget amount and the proposed budget variation data structure;

automatically linking the contract budget data structure that contains the total contract budget amount to the proposed budget variation data structure containing the request for the new variation to cause subsequent actions taken on the contract budget data structure including:
(i) identifying one or more actions that target the request object data structure and indexing the one or more actions to correspond to the response object data structure; and
(ii) recognizing the one or more actions as corresponding to the response object data structure based at least in part on the indexing;

receiving, by the budget management system from the first user, a second request for payment for work performed by the first user on the project, the second request for payment referencing the proposed new contract budget line item object of the proposed budget variation data structure; and updating the contract budget data structure to include the new proposed contract budget line item object of the proposed budget variation data structure that is linked to the contract budget data structure.

18. The method of claim 17, further comprising:
storing on the non-transient computer-readable memory a project budget data structure, the project budget data structure including a plurality of line item objects and a line item value for each line item object of the plurality of line item objects,
wherein a first line item object of the plurality of line item objects of the project budget data structure is associated with the contract budget data structure such that the line item value of the first line item object is equal to the total contract budget amount of the contract budget data structure;
receiving an approval from a second user of the request for the new variation to the total contract budget amount of the contract budget data structure;
updating the contract budget data structure to include the new proposed contract budget line item object of the proposed budget variation data structure;
increasing total contract budget amount of the contract budget data structure based on the value of the proposed new contract budget line item object; and
updating the line item value of the first line item object of the project budget data structure to equal the increased total contract budget amount of the contract budget data structure.

19. The method of claim 18, wherein receiving the second request for payment includes receiving the second request for payment before receiving the approval from a second user of the request for the new variation to the total contract budget amount of the contract budget data structure.

20. A construction project contract and budget system configured to process a variation of a construction project contract, the construction project contract being between a contractor and a second party for work to be performed on a construction project by the contractor for the second party, the system comprising:
a processor; and
a non-transitory, computer-readable memory storing instructions that, when executed by the processor, cause the system to
generate a request object data structure in response to receiving a proposed variation of the construction project contract, the proposed variation being initiated by the contractor, the request object data structure including at least one new contract component item, the at least one new contract component item of the request object data structure including a first new contract component item that includes an item ID field identifying an item ID of the first new contract line item, a target field identifying a memory location for a new contract line item in a contract budget data structure, and a proposed value field identifying a proposed value for the new contract line item;
store the request object data structure on the non-transitory computer-readable memory;
transmit a copy of the request object data structure to an external system associated with the second party;
receive, from the external system associated with the second party, a response object data structure indicative of an approved variation of the construction project contract, the response object data structure including at least one new contract component item, the at least one new contract component item of the response object data structure including a first new contract component item that includes a target field and an approved value field identifying an approved value for the new contract line item;
automatically determine matching data structures where the request object data structure corresponds to the response object data structure by identifying at least a similar identifier included in both the proposed variation of the request object data structure and the approved variation of the response object data structure;
in response to automatically determining the matching data structures, receive a match instruction, the match instruction identifying the request object data structure and the response object data structure as both corresponding to the proposed variation initiated by the contractor;

automatically link the request object data structure that contains the proposed variation to the response object data structure containing the approved variation to cause subsequent actions taken on the request object data structure including:
(i) identifying one or more actions that target the request object data structure and indexing the one or more actions to correspond to the response object data structure; and
(ii) recognizing the one or more actions as corresponding to the response object data structure based at least in part on the indexing;
automatically update the target field of the first new contract component item of the response object data structure to include the item ID of the first new contract component item of the corresponding request object in response to receiving the match instruction; and
update the contract budget data structure to include the new contract line item at the memory location identified by the target field of the first new contract component item of the request object data structure, the new contract line item including a cost value defined based on the approved value of the first new contract component item from the response object data structure.

* * * * *